United States Patent [19]
Bugga et al.

[11] Patent Number: 5,888,665
[45] Date of Patent: *Mar. 30, 1999

[54] LANI₅IS-BASED METAL HYDRIDE ELECTRODE IN NI-MH RECHARGEABLE CELLS

[75] Inventors: Ratnakumar V. Bugga, Arcadia; Brent Fultz, Pasadena; Robert Bowman, La Mesa; Subra Rao Surampudi, Glendora; Charles K. Witham; Adrian Hightower, both of Pasadena, all of Calif.

[73] Assignee: California Institute of Technology, Pasadena, Calif.

[ * ] Notice: The term of this patent shall not extend beyond the expiration date of Pat. No. 5,656,388.

[21] Appl. No.: 764,849

[22] Filed: Dec. 13, 1996

Related U.S. Application Data

[63] Continuation-in-part of Ser. No. 472,872, Jun. 7, 1995, Pat. No. 5,656,388.

[60] Provisional application No. 60/026,328 Sep. 19, 1996.

[51] Int. Cl.⁶ ........................................... H01M 4/86
[52] U.S. Cl. .................. 429/40; 429/27; 429/59; 429/101; 429/218; 420/900
[58] Field of Search .............................. 429/27, 223, 101, 429/59, 40, 218; 420/900

[56] References Cited

U.S. PATENT DOCUMENTS

| | | |
|---|---|---|
| 4,121,924 | 10/1978 | de Barbadillo, II . |
| 4,142,300 | 3/1979 | Gruen et al. . |
| 4,147,536 | 4/1979 | Osumi et al. . |
| 4,378,331 | 3/1983 | Bruning et al. . |
| 4,409,180 | 10/1983 | Sandrock et al. . |
| 5,085,944 | 2/1992 | Ebato et al. . |
| 5,306,583 | 4/1994 | Bouet et al. . |
| 5,434,022 | 7/1995 | Anani et al. . |

OTHER PUBLICATIONS

A. Hightower et al., "Performance of LaNi$_{4.7}$Sn$_{0.3}$ Metal Hydride Electrodes in Sealed Cells", Long Beach Battery Conference, 1998.

C. Witham, et al., "Electrochemical Properties of LaNi$_{5-x}$Ge$_x$ Alloys in Ni–MH Batteries", J. Electrochem. Soc., vol. 144, No. 11, Nov. 1997.

A.R. Miedema; The Heat of Formation of Alloys, Philips Technical Review, vol. 36, 1976, No. 8; pp. 217–231. (month N/A).

A.R. Miedema, et al.; Model Predictions for the Enthalpy of Formation of Transition Metal Alloys; *CALPHAD*, vol. 1, No. 4, pp. 341–359, Pergamon Press, 1977; Printed in Great Britain. month N/A.

M.H. Mendelsohn, et al.; The Effect on Hydrogen Decomposition Pressures of Group IIIA and IVA Element Substitutions for Ni in LaNi$_5$ Alloys, Materials Research Bulletin, vol. 13, pp. 1221–1224, Sep. 25, 1978. Pergamon Press, Inc.; Printed in the United States.

M. Mendelsohn, et al.; Group 3A and 4A Substituted AB$_5$ Hydrides; Inorganic Chemistry, vol. 18, No. 12, pp. 3343–3345; Mar. 5, 1979.

A.R. Miedema, et al.; Cohesion in Alloys–Fundamentals of a Semi–Empirical Model; Physica 100B (1980) pp. 1–28; North–Holland Publishing Company; Dec. 7, 1979.

A.K. Niessen, et al.; Model Predictions for the Enthalpy of Formation of Transition Metal Alloys II; *CALPHAD*, vol. 7, No. 1, pp. 51–70; 1983 (month N/A).

F. W. Oliver, et al.; Mossbauer Studies on LaNi$_{4.7}$Sn$_{0.3}$ and its Hydride; J. Appl. Phys., 57(1); Apr. 15, 1985.

J.J.G. Willems, et al.; From Permanent Magnets to Rechargeable Hydride Electrodes; Journal of the Less–Common Metals, 129 (1987) pp. 13–30. (month N/A).

Tetsuo Sakai, et al.; The Influence of Small Amounts of Added Elements on Various Anode Performance Characteristics for LaNi$_{2.5}$CO$_{2.5}$–Based Alloys; Journal of the Less–Common Metals, 159 (1990) pp. 127–139. (month N/A).

Tetsuo Sakai, et al.; Some Factors Affecting the Cycle Lives of LaNi$_5$–Based Alloy Electrodes of Hydrogen Batteries; Journal of the Less–Common Metals, 161(1990) pp. 193–202 (Month N/A).

R. Balasubramaniam, et al.; Solution Thermodynamics of Hydrogen in the Mischmetal–Ni$_5$System with Aluminum Manganese and Tin Substitutions; Journal of Alloys and Compounds, 185 (1992) pp. 259–271. (month N/A).

R. Balasubramaniam, et al.; Hydriding Properties of MmNi$_5$ System with Aluminum, Manganese and Tin Substitutions; Journal of Alloys and Compounds, 196 (1993); pp. 63–70 (month N/A).

Dhanesh Chandra, et al.; Cyclic Stability of Rare Earth Pentanickel Hydrides; Rare Earths, Extraction, Preparation and Applications; The Minerals, Metals & Materials Society, 1988. (month N/A).

I. Matsumoto and A. Ohta Matshushita; Metal Hydride Batteries and MpH Alloys; presented at the IBA Conference, Seattle, Washington; Oct. 1990.

Konstantin Petrov, et al.; Optimization of Composition and Structure of Metal–Hydride Electrodes; Journal of the Electrochemical Society, vol. 141, No. 7, pp. 1747–1750; Jul., 1994.

(List continued on next page.)

*Primary Examiner*—Bruce F. Bell
*Attorney, Agent, or Firm*—Limbach & Limbach L.L.P.

[57] ABSTRACT

An at least ternary metal alloy of the formula AB$_{(Z-Y)}$X$_{(Y)}$ is disclosed. In this formula, A is selected from the rare earth elements, B is selected from the elements of Groups 8, 9, and 10 of the Periodic Table of the Elements, and X includes at least one of the following: antimony, arsenic, germanium, tin or bismuth. Z is greater than or equal to 4.8 and less than or equal to 6.0. Y is greater than 0 and less than 1. Ternary or higher-order substitutions to the base AB$_5$ alloys that form strong kinetic interactions with the predominant metals in the base metal hydride are used to form metal alloys with high structural integrity after multiple cycles of hydrogen sorption.

20 Claims, 15 Drawing Sheets

OTHER PUBLICATIONS

Anaba A. Anani, et al.; Mechanically–Alloyed Hydrogen Storage Materials with High Gas Phase and Electrochemical Storage Capacities; Spring Meeting, Honolulu, Hawaii, May 16–21, 1993; The Electrochemical Society, Inc., Extended Abstracts, vol. 93–1, pp. 82–83, Abstract No. 55.

Konstantin Petrov, et al.; Optimization of Composition and Structure of Metal–Hydride Electrodes; Spring Meeting, Honolulu, Hawaii; May 16–21, 1993; The Electrochemical Society, Extended Abstracts, vol. 93–1, pp. 41–42, Abstract No. 27.

A. Anani, et al.; Characterization of an Sn–Modified $AB_5$–Type Alloy for Hydrogen Storage and Battery Applications; Fall Meeting, Toronto, Canada; Oct. 11–16, 1992; The Electrochemical Society, Inc., Extended Abstracts, vol. 92–2, p. 99, Abstract No. 64.

Konstantin Petrov, et al.; Sn–Modified $AB_5$ Type Alloys Prepared by Mechanical Alloying and Arc–melting Methods, for Hydride Electrodes; Fall Meeting, New Orleans, Louisiana, Oct. 10–15, 1993; The Electrochemical Society, Inc., vol. 93–2, Extended Abstracts, pp. 78–79, Abstract No. 46.

T. Sakai, et al.; Nickel–Metal Hydride Batteries, Using Rare–Earth Based Hydrogen Storage Alloys; Proceedings of the Symposium on Hydrogen Storage Materials, Batteries and Electrochemistry; The Electrochemical Society, Proceedings vol. 92–5, pp. 59–91, 1992. (month N/A).

J. McBreen, et al.; In Situ XAS Studies of Metal Hydride Electrodes; Spring Meeting, San Francisco, California, May 22–27, 1994, The Electrochemical Society, Inc., Extended Abstracts, vol. 94–1, p. 1198, Abstract No. 773.

M.P. Sridhar Kumar, et al.; Effect of Ce, Co and Sn Substitution on Gas–Phase and Electrochemical Hydriding/Dehydriding Properties of LaNi5; Spring Meeting, San Francisco, California, May 22–27, 1994, The Electrochemical Society, Inc., Extended Abstracts, vol. 94–1, pp. 1225–1226, Abstract No. 790.

A. Anani, et al.; Hydrogen Storage In Modified $AB_5$–type Alloys for Battery and Fuel Cell Applications; Fall Meeting, Toronto, Ontario, Canada, Oct. 11–16, 1992, The Electrochemical Society, Inc., Extended Abstracts, vol. 92–2, p. 720, Abstract No. 489.

C.K. Witham, et al.; Microstructural Effects of Hydrogen Charging and Discharging on $LaNi_{5-x}Sn_x$; Fall Meeting, Miami Beach, Florida, Oct. 9–14, 1994, The Electrochemical Society, Inc., Extended Abstracts, vol. 94–2, pp. 58–59, Abstract No. 38.

Konstantin Petrov, et al.; Optimization of Structure and Composition Metal–Hydride Electrodes, Using Sn–Modified $AB_5$ Type Alloy; Fall Meeting, New Orleans, Louisiana, Oct. 10–15, 1993; The Electrochemical Society, Extended Abstracts, vol. 93–2, pp. 80–81, Abstract No. 47.

B.V. Ratnakumar, et al.; Studies on $AB_5$ Metal Hydride Alloys with Sn Additives; Fall Meeting, Miami Beach, Florida, Oct. 9–14, 1994, The Electrochemical Society, Extended Abstracts, vol. 94–2, pp. 56–57, Abstract No. 37.

M. Tadokoro, et al.; Development of Hydrogen Absorbing Alloys for Nickel Metal Hydride Secondary Batteries; The Electrochemical Society, Proceedings of the Symposium on Hydrogen Storage Materials, Batteries, and Electrochemistry, vol. 92–5; pp. 92–104, 1992 (month N/A).

B. V. Ratnakumar, et al.; Studies on $AB_5$ Metal Hydride Alloys with Sn Additives; Proceedings of The Symposium on Hydrogen and Metal Hydride Batteries; Fall Meeting, Miami Beach Florida, Oct. 9–14, 1994, The Electrochemical Society, Inc., Battery Division, Proceedings vol. 94–27, pp. 57–67.

C.K. Witham, et al., Microstructural Effects of Hydrogen Charging and Discharging on $LaNi_{4.8}Sn_{0.2}$, Proceedings of the Symposium on Hydrogen and Metal Hydride Batteries; Fall Meeting, Miami Beach, Florida, Oct. 9–14, 1994, The Electrochemical Society, Inc., Battery Division, Proceedings vol. 94–27, p. 68–77.

B. V. Ratnakumar, et al.; Electrochemical Studies on $LaNi_{5-x}Sn_x$ Metal Hydride Alloys; J. Electrochem. Soc. vol. 143, No. 8, Aug. 1996, pp. 2578–2583.

C. Witham, et al.; Electrochemical Evaluation of Lani5–x Gex Metal Hydride Alloys; J. Electrochem. Soc. vol. 143, No. 9, Sep. 1996, L–205–L208.

5,888,665

LANI₅IS-BASED METAL HYDRIDE ELECTRODE IN NI-MH RECHARGEABLE CELLS

CROSS-REFERENCE TO RELATED APPLICATIONS

The present application is a nonprovisional application based on provisional application Ser. No. 60/026,328 filed Sep. 19, 1996 for Ge and Sn SUBSTITUENTS IN LaNi$_5$ FOR IMPROVED PERFORMANCE OF MH ELECTRODE IN Ni-MH RECHARGEABLE CELL and is a continuation-in-part application of application Ser. No. 08/472,872 filed Jun. 7, 1995 now U.S. Pat. No. 5,656,388, for METAL HYDRIDES AS ELECTRODE/CATALYST MATERIALS FOR OXYGEN EVOLUTION/ REDUCTION IN ELECTROCHEMICAL DEVICES, all of which are commonly assigned to the assignee of the present application.

ORIGIN OF INVENTION

This invention was made in the course of work done under a contract with the Department of Energy and is subject to the provisions of Public Law 96-517 (35 U.S.C. §202) in which the contractor has elected to retain title.

BACKGROUND OF THE INVENTION

The present invention is directed to intermetallic alloys for use as negative electrodes in hydrogen storage devices. Various intermetallic alloys have been widely used as negative electrodes in hydrogen storage devices for batteries. The nickel-metal hydride (Ni-MH) alkaline rechargeable battery, in which the positive electrode (cathode) is composed of nickel oxyhydroxide (NiOOH) and the anode is composed of a hydrided metal alloy, is the principle type of battery in which intermetallic hydrides are used.

The nickel-metal hydride battery satisfies the imminent need for environmentally-compatible rechargeable batteries superior to conventional nickel-cadmium (Ni—Cd) batteries in both versatility and performance. Nickel-metal hydride (Ni-MH) batteries have been developed by companies in the U.S. (Duracell) and Germany (Varta), and are in production by several companies in Japan (Sanyo, Matsushita Battery, Japan Storage Battery, Toshiba), Hong Kong (Gold Peak), and the U.S. (Eveready/Gates, Ovonic Battery, and Ovonic's licensee, Harding Energy Systems).

The Ni-MH electrochemical system utilizes a metal hydride (MH) anode in place of cadmium (Cd). Ni-MH batteries have operating characteristics similar to Ni—Cd. Both systems exhibit high rate discharge capabilities, fast charging, and similar voltage compatibilities. Likewise, both systems utilize similar charge cutoff methods and gas recombination mechanisms. The advantages of Ni-MH cells over Ni—Cd cells include: (1) higher specific energy (by a factor of 1.5–2.0 times), (2) higher energy density (160–200 Wh/l as compared to 70–120 Wh/l for Ni—Cd), (3) improved environmental compatibility, and (4) the promise of longer cycle life owing to the absence of life-limiting cadmium migration. The charge/discharge cycle lifetime of Ni-MH batteries has been limited by degradation of the metal alloy-based electrode.

An intermetallic alloy is considered suitable for use in an alkaline rechargeable battery if it satisfies two related physical criteria. First, the alloy should be able to absorb a large amount of hydrogen. Second, the alloy should also maintain a high degree of structural integrity and good hydrogen absorption characteristics over multiple charge/discharge cycles (e.g., hydrogen absorption/desorption). The first characteristic will be referred to as "capacity" or "hydrogen capacity," and the second characteristic will be referred to as "structural integrity" or "high cycle lifetime." The problem confronting designers of alkaline rechargeable batteries, therefore, is one of improving the structural integrity of the metal hydride alloy without sacrificing capacity.

The intermetallic alloys used in the anodes of alkaline rechargeable batteries include two generic classes: AB$_2$ and AB$_5$. In the AB$_2$ category—alloys which adopt a Laves phase crystalline structure—several alloys have been used as hydrogen storage materials. A typical AB$_2$ alloy may contain vanadium (V), titanium (Ti), nickel (Ni), zirconium (Zr), chromium (Cr) (e.g., $V_{22}Ti_{16}Zr_{16}Ni_{39}Cr_7$). These different elements are assigned functional roles in hydrogen absorption/desorption (charge/discharge) cycling such as hydrogen storage (V, Ti, Zr), enabling the formation of a protective oxide (Ti and Zr) and embrittling the alloy hydride to produce high surface areas (Zr). As expected with the above-mentioned metal hydride alloy, the microstructure contains several (at least four) phases. The rationale that was used in designing these alloys was that short, medium, and long-range disorder in crystal structure and composition were beneficial to the cycle lifetime, and that these disorders allowed for good hydrogen-metal bond strengths, hydrogen storage capacity, and catalytic activity.

In the AB$_5$ category—alloys which adopt a Haucke phase crystalline structure—most anode materials for Ni-MH batteries have been based upon LaNi$_5$. This binary alloy offers relatively high capacity for hydrogen absorption (up to 400 mAh/g), relatively high rates of absorption, mild activation treatments, and low equilibrium pressures. The usefulness of LaNi$_5$ as a metal hydride anode is limited since it suffers a rapid decline in capacity during charge/discharge cycling. This structural and functional degeneration of the alloy has been attributed to the formation of a thick layer of La(OH)$_3$, a process that is dependent on an intergranular diffusion of La to the surface of the electrode. The significant volume dilatation of the alloy upon hydriding (24%) causes pulverization, and is believed to promote the diffusion of elemental lanthanum.

Alloy modifications to LaNi$_5$ have been made by substituting other elements for lanthanum, nickel, or both, and by changing the overall stoichiometry of the alloy.

The prevailing methodology used to slow this degradation has been to substitute small amounts of other elements for both Ni and La. Willems, et al. reported in *J. Less Common Metals*, 129, 13 (1987) improved alloy stability during electrochemical absorption-desorption cycling by a partial substitution of Si and Co for Ni, and of Nd for La. As reported in *Proc. Symp. Hydrogen Storage Materials: Batteries and Electrochemistry*, ECS Proc. Vol. 98-5, p. 59 (1992); *J. Alloys and Compounds*, 180, 37 (1992), Sakai, et al. performed a comprehensive evaluation of several different elements as substitutes in LaNi$_{5-y}$M$_y$ where M corresponded to other transition metals. The cycle life was found to improve upon the substitution of Ni with the ternary solute in the order Mn<Ni<Cu<Cr<Al<Co. In other studies, Sakai, et al. showed that substituting some solutes for La also enhances the cycle lifetime. In all the above ternary alloys, the improvement in the cycle lifetime is unfortunately accompanied by a decrease in the hydrogen absorption capacity, long activation, or slow kinetics.

While structural integrity has improved as a result of these substitutions, the beneficial lifetime effect was uniformly accompanied by a reduction in the hydrogen capacity of the metal alloy. It has also been found that substitution of other rare earth elements, such as cerium (Ce) and neodymium (Nd), for La improves the lifetime of Ni-MH batteries under charge/discharge cycling. These results were especially auspicious for mischmetal (Mm) substitutions for La in the LaNi$_5$-based ternary or higher-order alloys. Naturally-occurring Mm is comprised of a mixture of the early elements in the rare earth series. With Chinese Mm estimated to cost only about $5/kg, Mm substitutions for La would improve considerably the economics of AB$_5$ battery electrodes and may be a desirable substitute to ensure commercial viability in the consumer marketplace.

A beneficial aspect of the Haucke phase structure is that it can be retained even when the ratio of B atoms to A atoms is different than 5.0, as discussed by K. H. J. Buschow and H. H. van Mal, *J. Less Common Metals*, 29 (1972), p 203. In stoichiometric AB$_5$ alloys, the crystallographic A site is occupied exclusively by La and its substituents, and the B sites are occupied by Ni and its substituents. Buschow and van Mal have suggested that, when this ratio is less than 5, some B sites become occupied with A atoms. W. Coene, et al. found that when the ratio is greater than 5 and up to 6, depending on the particular B atom being substituted, some A sites are occupied with pairs of B atoms (*Philosophical Magazine A*, 65 (1992), p 1485). Notten, et al. (*J. Alloys and Compounds*, 210 (1994), p. 221) have produced electrochemical cells with off-stoichiometric Cu-substituted alloys. These examples show that the stoichiometry of Haucke phase metal hydride alloys does not have to be restricted to B/A =5.0. (Hereinafter, Haucke phase alloys included in the present invention will be referred to as either AB$_5$-based alloys or AB$_z$ alloys where $4.8 \leq z \leq 6.0$.)

It is unclear, however, what—if any—rationale has been used by the designers of the above-mentioned AB$_5$-based alloys. As noted above, various alloy modifications to LaNi$_5$ have been made yet no guiding principle for the design of stable LaNi$_5$-based or MmNi$_5$-based ternary or higher order metal alloys has been devised. Currently; it is accepted that the structural integrity of AB$_5$ and higher order AB$_5$-based alloys is determined primarily by the change in atomic volume during hydrogen absorption and that the deterioration of battery cells is controlled by the thermodynamic tendency to form oxides of the rare earth metal on the surface of the anode. In the analysis of AB$_5$ and AB$_5$-based alloys, several competing theories regarding the structural integrity of metal alloys upon multiple cycles of hydrogen sorption have been advanced. Many of these substitution strategies appear to be based on a random sampling of candidate elements. None of these theories or explanations for improved structural integrity of these metal alloys can be applied uniformly to the variety of alloy compositions used in the anode of alkaline rechargeable cells. Furthermore, none accurately predicts the behavior of a class of metal hydride alloys upon hydriding and, therefore, none can be used to choose suitable candidate elements for substitution into a binary or higher order metal alloy.

It is clear, however, that ternary solute additions such as Sn can improve the cycle lifetimes of LaNi$_5$-based alloys during hydrogen absorption/desorption cycling but it is not clear why this is so. Furthermore, efforts to improve the structural integrity of metal alloys has resulted in a corresponding, and often overwhelming, loss of hydrogen capacity.

Mendelsohn, et al. (*Inorg. Chem.*, 18, 3343 (1979) and *Rare Earths in Modern Science and Technology*, edited by G. J. McCarthy and J. J. Rhyne, Plenum, N.Y., 1980, p. 593) determined the reactivity of LaNi$_{4.6}$M$_{0.4}$ alloys (where M=Al, Ga, In, Si, Ge, or Sn) with hydrogen gas. They reported that substitutions with these elements caused the unit cell volumes to enlarge which they correlated with decreases in the hydrogen desorption plateau pressures from the equilibrium pressure for LaNi$_5$. These elements also produced undesirable reductions in total hydrogen storage capacities from that found with LaNi$_5$. Although Si substitution significantly reduced hydrogen capacity, Meli, et al. have reported (in *J. Alloys and Compounds*, 190, 17 (1992) and *J. Physk. Chem.*, 183, 371 (1994)) fast activation and very high stability upon electrochemical cycling of some Si substituted AB$_5$ alloys.

The use of Sn as a partial substituent for Ni in LaNi$_5$ was first reported by Mendelsohn, et al. in 1978 (*Mat. Res. Bull.*, 13, 1221 (1979)). LaNi$_{4.6}$Sn$_{0.4}$ was found to have a plateau pressure of 0.076 atm, very low hysteresis, and an absorption capacity corresponding to a hydrogen-to-metal ratio of 0.97 (later measured to be 0.82 by S. Luo, et al., *J. Alloys and Compounds* (231, 467 (1995)). Tin also enhances the durability of the alloy, as evident in the works of Chandra, et al. (D. Chandra and F. Lynch, *Rare Earths,* The Metallurgical Society, Warrendale, Pa., 83 (1988)). The alloy LaNi$_{4.8}$Sn$_{0.22}$ exhibited a capacity loss of only 15% after 10,000 gas-phase thermal absorption/desorption cycles. Our work showed the gas-phase cyclic lifetime of LaNi$_{4.8}$Sn$_{0.2}$ to be 20 times greater than that of the binary alloy (as reported in R. C. Bowman, et al., *J. Alloys and Compounds*, 217, 85, (1995), incorporated herein by reference).

Thus, an object of the present invention is to identify ternary or higher-order alloys aimed at improving the structural integrity of the metal alloy over multiple charge/discharge cycles in an alkaline liquid medium, such as is the case for a rechargeable battery, while retaining high hydrogen capacity.

The present invention is also directed to electrode/catalyst materials for oxygen evolution/reduction reactions in batteries, fuel cells and electrolysers. The oxygen reduction reaction is utilized as the cathodic reaction in various electrochemical cells such as metal-air cells and fuel cells. The typical reactions for oxygen reduction are:

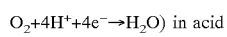

O$_2$+4H$^+$+4e$^-$→H$_2$O) in acid

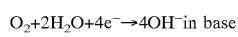

O$_2$+2H$_2$O+4e$^-$→4OH$^-$ in base

The reduction of oxygen is routinely catalyzed by a variety of materials depending on the electrolyte and system temperature. Noble metals, and in particular platinum, have been traditionally used as the oxygen reduction catalyst in such systems. Platinum is normally dispersed on a high-surface area carbon support material to provide maximum capacity per unit mass of electrocatalyst.

A problem with using platinum as the oxygen reducing catalyst is that it is rather expensive. Thus, an object of the present invention is to identify relatively less expensive materials for use as an oxygen reducing catalyst in electrochemical devices and, in particular, fuel cells.

SUMMARY OF THE INVENTION

The present invention is directed to metal hydride alloys which exhibit good structural integrity and hydrogen capacity. In a preferred embodiment, the elements chosen to comprise the metal alloy should be selected to suppress metal hydride disproportionation transformations in AB$_{(Z-Y)}$X$_{(Y)}$ wherein $4.8 \leq Z \leq 6.0$ by substituting for B those ternary elements that bond strongly with A, and perhaps also with B.

To do so, we use ternary or higher order solutes so that the binary alloys AX will have large heats of formation and, as a secondary consideration, so that the binary alloys BX will have large heats of formations. Antimony, arsenic, and bismuth as ternary substitutes X will yield $LaNi_5$-based ternary alloys with cycle lifetimes superior to that of $LaNi_{(Z-Y)}Sn_{(Y)}$ where $4.8 \leq Z \leq 6.0$ since the enthalpies of formation of LaSb, LaAs, and LaBi are relatively higher than the enthalpy of formation of LaSn, as shown in the following Table.

TABLE I

Calculated and Experimental Enthalpies of
Formation of Various Binary La-X Compounds

| kcal | Ni | Al | In | Sn | Bi | Si | Ge | Sb | As |
|---|---|---|---|---|---|---|---|---|---|
| calc | −4 | −17 | −20 | −22.5 | −23.5 | −25 | −27 | −27 | −28 |
| exp | −3.51 | −19.9 | −22.7 | −20.9 | −26.5 | −23.7 | −27.8 | −31.2 | −36.6 |

"calc" = calculated
"exp" = experimental

The "experimental" values reported in Table I are based on newly published data (from C. Colinet and A. Pasturel, chapter 134 in K. A. Schneider, Jr., L. Eyring, G. H. Lander, and G. R. Choppin, eds. *Handbook on the Physics and Chemistry of Rare Earths*, Vol. 19: Lanthanides/Actinides: Physics II, Elsevier, Amsterdam, The Netherlands (1994)) coming available since the filing of the patent application Ser. No. 08/472,872 filed Jun. 7, 1995, now U.S. Pat. No. 5,656,388. The "calculated" data are derived from a model-dependent parameter that reasonably well predicts the trend identified by the inventors as indicative of potentially suitable ternary solutes for alloys according to the present invention. As can be seen from the table by comparing the calculated data with the experimental data, the order of In and Sn solutes in terms of increasing (i.e., more negative or exothermic) enthalpy of formation changes depending on whether one uses the calculated or experimental values. Otherwise, both the calculated and the experimental data exhibit similar increasing enthalpy trends that would be similarly useful in predicting solutes that could be included in the alloys according to the present invention. The inventors however prefer the "experimental" values.

More particularly, the present invention relates to the partial substitution of Ge or Sn for Ni in $LaNi_5$ to improve the performance of metal hydride anodes (Ni-MH). For Sn substitution the degree of substitution in the resultant alloy $LaNi_{5-y}Sn_y$ where $0.1 \leq y \leq 0.5$. For optimal capacities, cyclic lifetimes, and kinetics, the best Sn composition is $LaNi_{5-y}Sn_y$ alloys is $y \cong 0.25$. This alloy exhibits properties comparable to the state-of-the-art MH materials (e.g., $MmNi_{3.5}Co_{0.5}Mn_{0.4}Al_{0.3}$) now being used in rechargeable batteries. The Sn substituent thus solves the problems of instability of the cyclic lifetimes and reduction in capacity of MH electrodes.

Ge substitution of 6–10 wt % of Ge for Ni in $LaNi_5$ also produces several desirable modifications in properties for battery electrode applications including lower equilibrium pressures, high charge efficiency, improved cycle lifetimes, and faster kinetics for both absorption and desorption.

It should be emphasized that the alloy design strategy of the present invention may be used to design quaternary and higher-order metal alloys which will form stable metal hydride alloys. For example, the substitution of the combination of tin and antimony for Ni in $LaNi_5$-based alloys should have an effect comparable to the average of the effects seen for tin substitution and antimony substitution for Ni.

It should be noted that while much of the prior art is directed to the design of metal hydride alloys for use in the anode of alkaline rechargeable batteries, the present invention also finds application in gas-phase hydrogen storage and hydrogen transport devices, as well as other applications in which metal alloys with high structural integrity would be desirable.

The present invention is also directed to alloys used for the electrocatalysis of the oxygen reduction reaction in electrochemical devices such as fuel cells and metal-air cells. It has been found that the $AB_5$-based alloys described above are not only useful in hydrogen storage devices but also may be used as electrocatalyzers for the oxygen reduction reaction. Thus, the $AB_5$-based alloys described herein provide a low cost alternative to the conventional noble metal catalysts. A particularly useful application of the present invention is as a bipolar electrode for bipolar metal hydride air cells or hydrogen-oxygen fuel cells.

DETAILED DESCRIPTION OF THE INVENTION

The invention relates to metal hydride alloys and, more specifically, the present invention is directed to an at least ternary metal hydride alloy which exhibits high stability over multiple cycles of hydrogen sorption. The alloy design strategy of the present invention is based on suppressing the kinetics of phase transformations such as disproportionation and subsequent oxidation. Specifically, the design approach suppresses the mobility of the metal hydride alloy elements—especially of the heavier rare-earth atoms, by locking them into the local structure of the Haucke phase.

The basic design philosophy is based upon our observation that a correlation exists between improved cycle lifetimes and the heat of formation of a proposed AX alloy. The calculated data on alloy heat of formation were obtained from the semi-empirical method of A. R. Miedema, which was successful in predicting the empirical heats of formation of several equilibrium compounds of LaX. The semi-empirical method of Miedema is described in *Model Predictions for the Enthalpy of Formation of Transition Metal Alloys II,* Calphad, Vol 7, No. 1, pp. 51–70, 1993; *Cohesion in Alloys- Fundamentals of a Semi-Empirical Model,*, A. R. Miedema, Physica 100B (1980) 1–28; *The Heat of Formation of Alloys,* A. R. Miedema, Philips Technical Review, Vol. 36, 1976, No. 8; and *Model Predictions for the Enthalpy of Formation of Transition Metal Alloys,* Calphad, Vol. 1, No. 4, pp. 341–359; each of which are herein incorporated by reference. As discussed above, the experimental data is based on newly published data from C. Colinet and A. Pasturel, chapter 134 in K. A. Schneider, Jr., L. Eyring, G. H. Lander, and G. R. Choppin, eds. *Handbook on the Physics and Chemistry of Rare Earths,* Vol. 19: Lanthanides/Actinides: Physics II, Elsevier, Amsterdam, The Netherlands (1994)).

Figure 1:
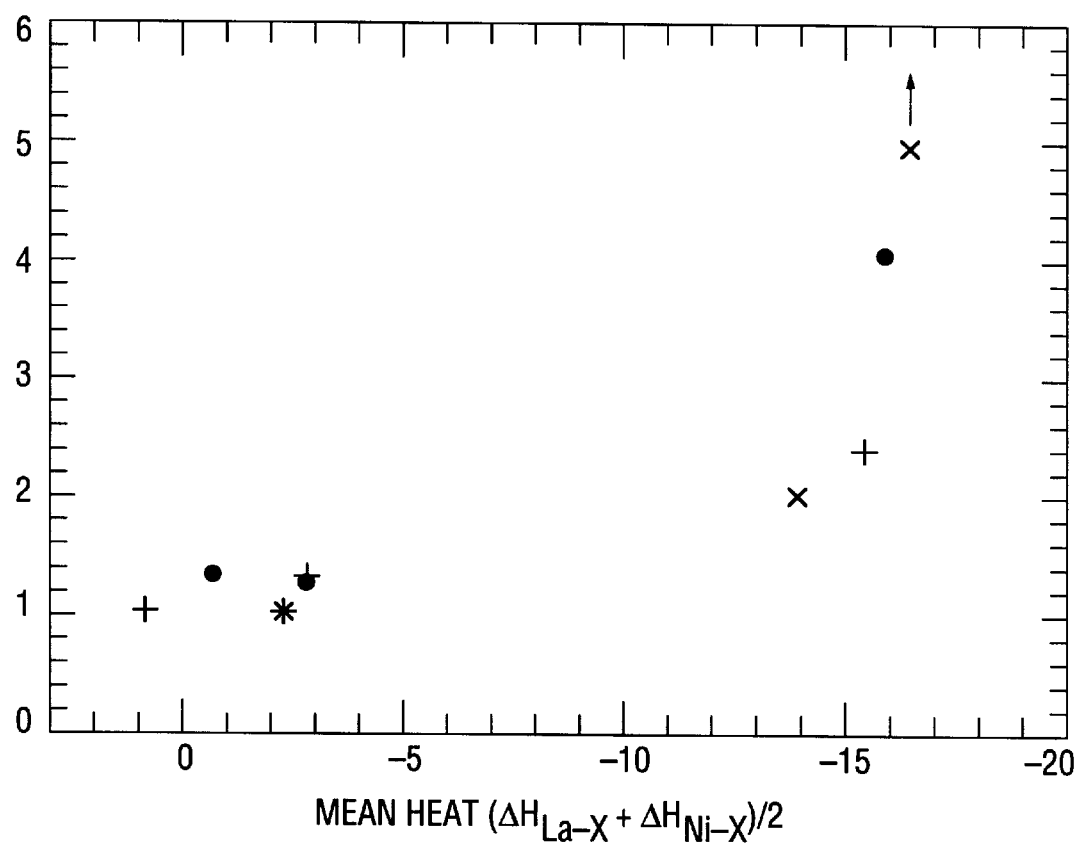
FIG. 1 shows the improvement in cycle lifetime of $LaNi_{5-\delta}X_\delta$ with respect to binary $LaNi_5$ for several ternary substitutes X as a function of the average of Miedema's heat of formation of LaX and NiX alloys.

X-ray diffraction measurements, used to determine the precise structure of Haucke phase metal alloys, have showed that the Sn atoms in $LaNi_{4.8}Sn_{0.2}$ reside in 3 g sites on the Ni-plane of the Haucke phase crystals. In such a structure, the Sn atoms have four La "neighbors." Other ternary substitutes such as antimony (Sb), arsenic (As), and bismuth (Bi) will likely occupy the same crystallographic sites as tin. Referring to FIG. 1, a plot of the lifetime ratio (i.e., the number of cycles for a substituted ternary alloy to reach 50% of its maximum capacity divided by the number of cycles it takes for $LaNi_5$ (under the same test conditions) to reach 50% of its maximum capacity) as a function of the average of the heat of formation of a LaX compound and the heat of formation of a NiX compound is shown. Data for binary alloy LaX is at the star at (−2,1.0). The degree of correlation between these parameters is striking.

The crystallographic information, together with the correlation between cycle lifetime and the average heats of formation of the binary components of the ternary alloy seen in FIG. 1, suggests that controlling the chemical bond strength between the ternary substitute atom and the lanthanum atom is a way to manipulate the cycle lifetime and, thus, the structural integrity of the $AB_5$-based alloys. Noting that hydrides of $LaNi_5$ are thermodynamically unstable against a disproportionation reaction, the lanthanum atoms and nickel atoms segregate into small but distinct regions. We concluded that it was improbable that the large thermodynamic driving force for disproportionation dominated over the related kinetic driving force. As an alternative, we considered evidence suggesting that such a disproportionation reaction is controlled strongly by diffusion kinetics. This evidence was found in studies of hydrogen absorption/desorption cycling of $LaNi_5$.

Furthermore, the kinetics of metal atom movements can be used to control the cycle lifetimes of $AB_{(Z-Y)}X_{(Y)}$ alloys according to the present invention and the ternary substitutes for B alter the kinetics. It is known that metal atom diffusivities in strongly ordered compounds are especially low. The activation energies for diffusion are large, and become larger still as the state of order becomes more perfect. This is now accepted as being due in part to the strong chemical bonds that must be broken as atomic movement occurs. In ordered alloys and intermetallic compounds, for example, activation energies for diffusional processes have been shown to increase with the critical temperature of the ordered phase, which reflects the average strength of chemical bonding in the alloy.

Based on the crystallography of the Haucke phase and the large difference in the size of lanthanum and nickel atoms, it is almost certain that the lanthanum atoms are the slow-moving species in phase transformations such as the disproportionation reaction. We expect that the lanthanum atoms must undergo some movement. Diffusive jumps of the nickel atoms should also be restricted, especially if the ternary solutes also have strong bonding to nickel atoms. If the ternary solutes sit on Ni sites with many La neighbors, the most promising ternary solutes for suppressing diffusivity should be those with the strongest chemical bonds to lanthanum atoms. Our alloy design strategy is based on suppressing the kinetics of phase transformations, such as disproportionation, and subsequent oxidation. In this manner, the mobility of the lanthanum atoms is reduced thereby locking them into the local structure of the Haucke phase.

Our alloy design strategy is at odds with current thinking that the stability of $LaNi_5$-based alloys is determined primarily by its change in atomic volume during hydrogen absorption and that the deterioration in battery cells is controlled by the thermodynamic tendency to form $La(OH)_3$ on the electrode surface. We demonstrate, however, that both of these problems are closely related to atom movements, especially of the La atoms in the $LaNi_5$-based alloys. Diffusion in the crystal is first necessary before La atoms can move to grain boundaries and then migrate to the electrode surface. Suppressing diffusion should suppress the corrosion problem at its source. It is well-known that diffusion is influenced strongly by the defect density in crystalline materials. The volume dilatation upon hydriding will certainly increase the defect concentrations, as we have found in the large broadening of XRD peaks and local strain contrast seen in TEM studies of LaNi, alloys that have been activated. High defect concentrations may well enhance the kinetics of diffusion, facilitating disproportionation in battery materials at low temperatures.

Applying the novel design philosophy of the present invention to the Haucke phase alloys, it becomes straightforward to select embodiments of stable metal hydride alloys with the generic formula: $AB_{(Z-Y)}X_{(Y)}$ where $4.8 \leq Z \leq 6.0$ and $Y \geq 0$. Because the A atoms are generally heavier than the B atoms, and because each ternary substitute atom X will be positioned next to four A atoms in the Haucke phase, compositions in which the binary alloys AX have high heats of formation are preferred over composition in which the binary alloys BX have high heats of formation. Still, both alternatives should yield alloys with high structural integrity.

For example, by using the semi-empirical method of Miedema, the following ternary or higher-order substitutions for Ni in $LaNi_5$-based alloys will lead to stable intermetallic alloys. Substitution of Ni with antimony (Sb) is presently a preferred embodiment. LaSb has a (calculated) heat of formation of −36 kcal/mole, eight kcal/mole greater than that of LaSn. (As used herein the term "greater," when referring to heats of formation, shall mean greater in magnitude, disregarding the sign.) Furthermore, Sb is a neighbor of tin (Sn) on the Periodic Table of the Elements, and has about the same metallic radius as tin. This suggests that the volume dilatations associated with adding antimony should be about the same as for Sn. Another neighbor of Sn is indium (In) which also has about the same atomic radius as tin. Indium, however, has a lower predicted heat of formation in a compound with lanthanum (-22 kcal/mole [calculated] for In—La versus -28 kcal/mole [calculated] for Sn—La). As for other ternary substitutes, the heat of formation for arsenic (As) is -36 kcal/mole [calculated] for As—La. The heats of formation of Bi—La is -32 kcal/mole [calculated], and for Ge—La, the heat of formation is -25 kcal/mole [calculated]. These elements should also form stable metal hydride alloys when used to partially substitute for Ni in a $LaNi_5$-based alloy hydride. These predictions based on the calculated enthalpies of formation are verified using the experimental data included in Table I.

To demonstrate that the metal hydride alloys of the present invention exhibit high stability over multiple cycles of hydrogen absorption and desorption, we subjected the alloys to multiple charge/discharge cycles, measuring the absorption capacity and structural integrity at selected intervals. However, cycle lifetimes are difficult to measure and no standard method to measure cycle lifetimes exists. We have chosen one of a variety of different test conditions available for compiling data on cycle lifetimes. Data which relate structural integrity to alloy composition were collected from studies of both gas absorption/desorption cycling, and battery cell charge/discharge cycling. The invention will be better understood by way of the following examples:

EXAMPLE 1.

The manufacture of the metal hydride alloy ingots was carried out in the following manner. Tin-substituted alloys according to the present invention were prepared by melting high purity (99.99%) materials in an induction-melt furnace under an argon overpressure of about 3 psi. The ingots were then sealed in quartz ampoules that had been vacuum purged and backfilled with argon, and were annealed at 950° C. for periods of between 72 and 90 hours.

EXAMPLE 2.

Three $LaNi_{5-y}Sn_y$ alloys according to the present invention with Y=0.0, 0.1, and 0.2 were obtained and ingots of these alloys were prepared by arc-melting appropriate amounts of high purity (e.g., >99.95 atomic percent) metals. Optical metallography and x-ray diffractometry showed that all three alloys were single phase after the ingots had been vacuum annealed for several days at 1170K (Y=0.1) or 1220K (Y=0.0 and 0.2). Pieces of the ingots were ground into 100 mesh powder for loading into an electropolished 316L stainless steel reaction vessel. The initial activation of the powder consisted of several evacuation and hydrogen absorption cycles using a high vacuum compatible gas-handling system based upon a turbomolecular vacuum pump station and with MKS Instruments model 315 Baratron high precision capacitance manometers. After activation, the reactor was opened in a glove box with an argon atmosphere containing oxygen and water levels below 1.0 ppm and 0.1 ppm, respectively. Portions of the activated $LaNi_{5-Y}Sn_Y$ powder were retained for characterization by x-ray diffraction, surface area measurements by the BET method, and scanning and transmission electron microscope examinations. Nominal 5 gram samples of the activated alloy powder were accurately reweighed, and returned to the reactor vessel for isotherm measurements and thermal cycling.

A gas manifold and calibrated volumes were assembled with electropolished 316L stainless steel and VCR Fittings. A Tribodyn oil-free vacuum pump with a base pressure below $10^{-4}$ Torr was attached to the manifold. A Setra model 212FT pressure transducer was used to monitor the pressure to over 35 atm. Research grade (99.995% purity) hydrogen was supplied to the system through a clean stainless steel pressure regulator. For isotherm measurements between 298K and 363K, the reaction vessel was submerged in a thermally-regulated water bath. Thermal cycling between temperatures above 500K to room temperature (i.e., 293–295K) was performed with a resistively-heated copper tube furnace that enclosed the reactor vessel. Cooling was provided by a fan that blew air inside the copper sleeve and over the reactor. Type-K (i.e., chromel-alumel) thermocouples provided temperature data to an Macintosh SE computer with a Data Translation analog-to-digital converter board. Pressure data from the Setra transducer were also acquired through this board. Digital outputs from this board controlled the heater and fan. A temperature cycle consisted of 40 minutes of heating to the nominal 500K upper temperature followed by 40 minutes of fan cooling which returned the temperature to about 295K. The thermocouple in the center of the reactor vessel showed that about 90% of the temperature change in the heating and cooling transitions occurred within 5–10 minutes. Table II presents the hydrogen pressure over the $LaNi_{5-y}Sn_yH_x$ just before starting the thermal cycling ($P_{LOW}$), the nominal high temperature limit ($T_{High}$), the pressure ($P_{High}$) at $T_{High}$, and the reversible change in hydrogen content $\Delta x$ obtained from the measured pressures in the first thermal absorption-desorption cycle.

TABLE II

Pressures, temperatures, and reversible hydrogen contents $\Delta x$ of the first and last thermal cycles for three $LaNi_{5-y}Sn_yH_x$ samples

| Alloy Composition | Cycle Number | $P_{low}$ (atm) | $T_{low}$ (K) | $P_{High}$ (atm) | $T_{High}$ (K) | $\Delta x$ |
|---|---|---|---|---|---|---|
| $LaNi_{5.0}$ | 1 | 15.6 | 297 | 29.3 | 508 | 6.96 |
|  | 520 | 16.4 | 296 | 24.6 | 504 | 3.05 |
| $LaNi_{4.9}Sn_{0.1}$ | 1 | 12.9 | 297 | 25.5 | 502 | 6.64 |
|  | 1453 | 16.0 | 295 | 21.4 | 542 | 1.96 |
| $LaNi_{4.8}Sn_{0.2}$ | 1 | 16.9 | 294 | 30.4 | 511 | 6.29 |
|  | 1330 | 17.4 | 297 | 29.7 | 509 | 5.65 |

The x-ray diffraction measurements were performed using an Inel CSP-120 Debye-Scherrer powder diffractometer system with a sealed tube source of Co K$\alpha$ radiation and an incident beam monochrometer. The position-sensitive detector had a window that subtend 127° in 2$\theta$ angle with a resolution of 0.04 degrees.

The microstructures of activated and cycled $LaNi_{5-y}Sn_yH_x$ powders were studied with a Philips EM430 transmission electron microscope operating at 300 keV. This instrument included an EDAX model 9900 energy-dispersive x-ray analyzer that was used to determine the relative ratios of the metals in various regions of interest. The transmission electron microscopy (TEM) specimens were prepared by grinding the friable alloy powders as suspensions in the volatile and inert fluorocarbon liquid, Fluorinert FC-43 (3M Industrial Chemical Products, St. Paul, Minn.). Since the powders had been placed into this liquid while they were inside the argon atmosphere glove box, air exposure of the particles was minimized before the finely ground samples were inserted into the TEM vacuum stage.

The cycling experiment confirms that small amounts of Sn substitution (i.e., y≈0.1–0.2) greatly inhibit the intrinsic disproportionation of $LaNi_{5-y}Sn_y$ during thermal cycling. The effect is quite remarkable in that $LaNi_{4.8}Sn_{0.2}H_x$ is almost immune to degradation under conditions where $LaNi_5H_x$ has suffered a 60% degradation and $LaNi_{4.9}Sn_{0.1}H_x$ has lost about 15% of its reversible capacity. Since the free energy for the disproportionation of $LaNi_5H_x$ is estimated to be about –96 KJ/mol $H_2$, it seems unreasonable that a mere 4% substitution of Sn for Ni could suppress thermodynamically such a favorable reaction. We believe that Sn atoms alter the kinetics for disproportionation by reducing the metal atom mobilities, or perhaps by retarding the nucleation kinetics of the reaction products.

Although the rate of decomposition is decreased significantly for $LaNi_{4.9}Sn_{0.1}H_x$, the products Ni and $LaH_x$ are formed in both alloys. The correlation between the disproportionation in our three alloys and the loss of reversible hydrogen storage capacity is strong. Although this comparison does not yield a linear dependence (since the $LaNi_{4.9}Sn_{0.1}$ alloy showed less deterioration in $\Delta x$ than would be expected from its abundance of Ni and $LaH_x$), the qualitative relationship between these parameters is reasonably good. The deterioration in $\Delta x$ correlates closely with the extent of the disproportionation reaction. The same disproportionation reaction seems to occur in the presence of Sn, but at a slower rate.

Dilute substitutions of Sn for Ni in $LaNi_5$ were shown to provide dramatic improvements in the stability of the ternary hydride phase during thermal cycling from room temperature to over 500K. The degradation in the reversible hydrogen storage capacity $\Delta x$ was suppressed by a factor of 20 for $LaNi_{4.8}Sn_{0.2}$ in comparison to the degradation of binary $LaNi_5$. This degradation in $\Delta x$ involved an increase in the low pressure region before the distorted plateau in the P-x isotherm, consistent with the formation of the thermodynamically stable fcc $LaH_x$ phase. The high concentration limits of the plateaus were found to decrease for the degraded alloys and the residual plateaus also had increased slopes. These effects are consistent with the presence of defects and composition inhomogeneities in the cycled Haucke phase.

X-ray diffractometry and transmission electron microscopy showed that a disproportionation reaction, leading to the formation of fcc $LaH_x$ and elemental Ni, accompanied the degradation in $\Delta x$. There was reasonable consistency between the amount of these reaction products and the amount of degradation in the three alloys studied, although the reaction products may not have the same detectability in different alloys due to variations in their size. We suggest it is unlikely that such a small amount of Sn will have a strong effect on the thermodynamic stability of $LaNi_5$ against disproportionation, so the Sn atoms probably affect the kinetics of nucleation or diffusional growth of the reaction products.

Sn Substitution

The $LaNi_{5-y}Sn_y$ alloys with $0.0 \leq y \leq 0.5$ were prepared by either arc-melting or induction-melting and subsequently annealed in vacuum at 950° C. for 72 hours. X-ray diffraction patterns confirmed that these alloys were single phase. Pressure-composition-temperature isotherms were measured with an automatic Sievert's apparatus. The absorption plateau pressure of $LaNi_5$ decreases upon the substitution of small amounts of Ni with Sn. The plateau pressure continues to decrease with increasing Sn composition because of the corresponding increase in unit cell volume. For a negative electrode application in a rechargeable cell, it is essential that the MH alloy have a low absorption pressure to facilitate easy charging, high charge retention and low ambient (operating) pressures inside the cell. Plateau pressures above 1 atm. promote self-discharge and the formation of hydrogen at the electrode surface during charging, considerable reducing the material's capacity. The desorption pressures, on the other hand, need to be $>10^{-3}$ atm. to permit complete discharging of the cell. Our gas-phase studies suggested that a partial substitution of Ni with Sn provides the alloys with absorption/desorption pressure appropriate for sealed cells. Additionally, the hysteresis between the absorption and desorption pressures of $LaNi_5$ is reduced in the Sn-substituted alloys.

Figure 2:
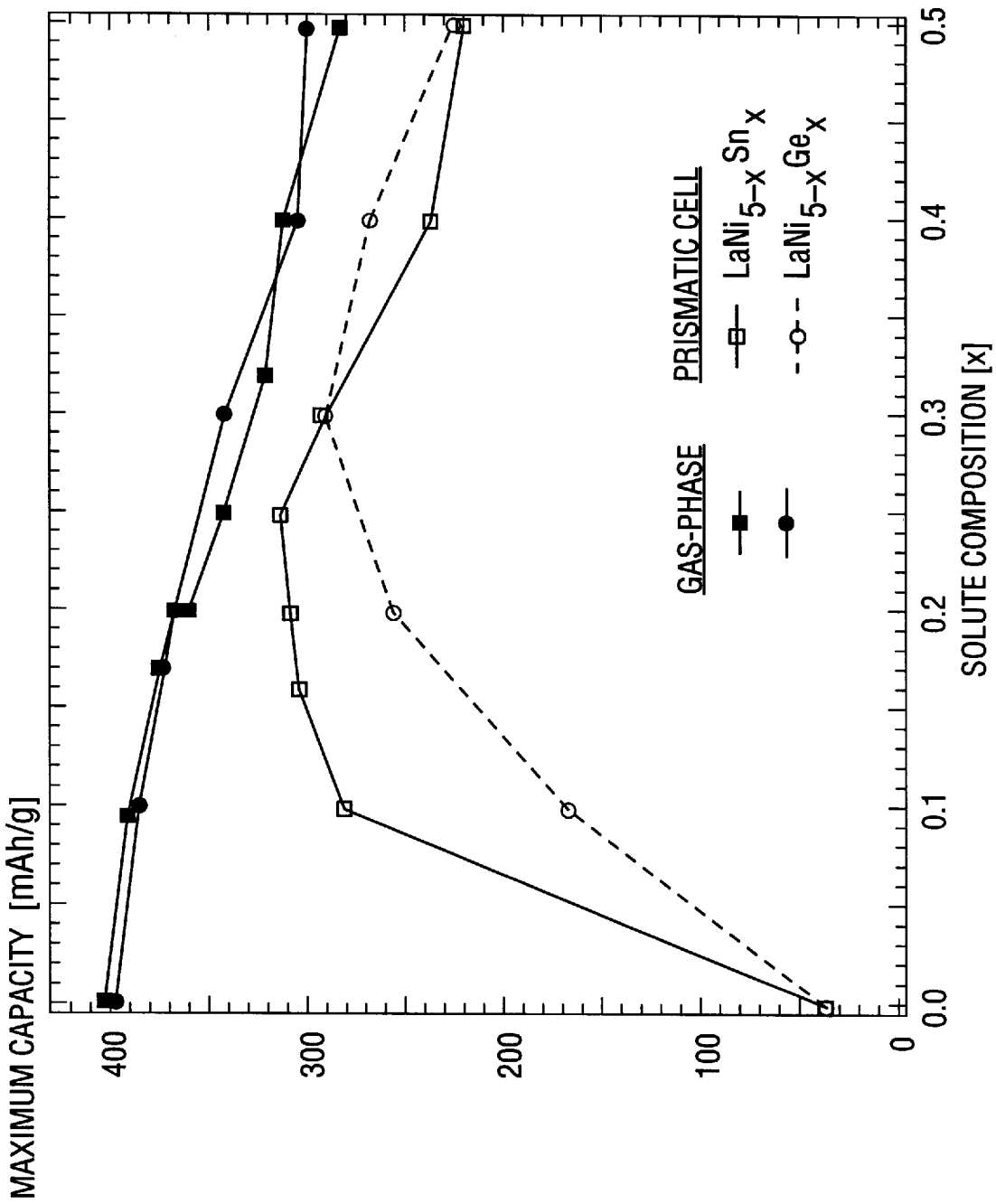
FIG. 2 illustrates hydrogen absorption capacities of $LaNi_{5-y}Sn_y$ (■) and $LaNi_{5-y}Ge_y$ (●) alloys measured by gas-phase absorption (closed symbols) and prismatic electrochemical cells (open symbols)

The electrochemical capacity improves significantly for small substitutions of Ni with Sn, as shown in FIG. 2. This improvement results mainly from the reduced plateau pressures. The maximum discharge capacity observed is slightly over 300 mAh/g at a discharge rate of C/2, which is an impressive value for an $AB_5$ alloy. For example, some of the mischmetal-based $AB_5$ MH alloys now being processed for electrodes in Japan and China showed maximum capacities of 250–275 mAh/g in evaluations performed at JPL (B. V. Ratnakumar, et al., Proc. 36th Power Sources Conf., Jun. 6–9, 1994, Cherry Hill, N.J.). The low plateau pressures produced by the Sn-substitution also provide low operating pressures and low self-discharge in an alkaline rechargeable battery.

Figure 3:
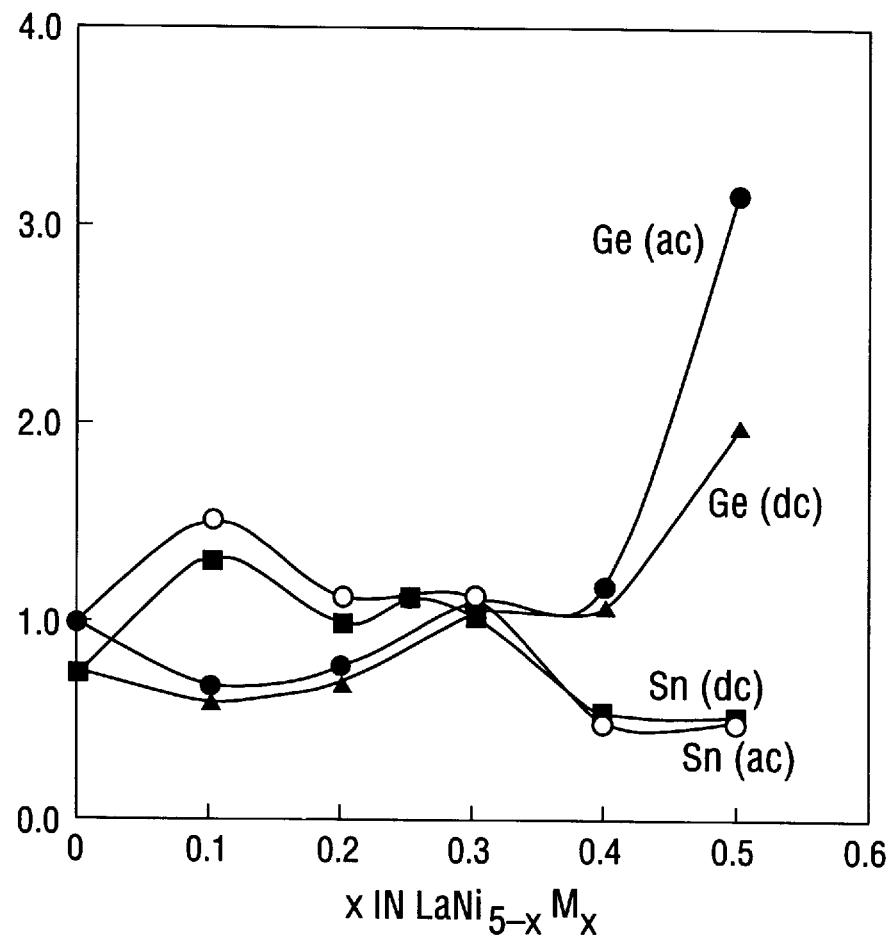
FIG. 3 illustrates variation of the exchange current density from DC micropolarization (dc), AC impedance (ac) for electrochemical cells of the $LaNi_{5-y}Sn_y$ and $LaNi_{5-y}Ge_y$ alloys.

To determine the effects of the partial substitution of Ni with Sn on the charge and discharge kinetics, DC polarization (linear and Tafel) and AC impedance experiments were carried out on the alloys (FIG. 3, Table III). The exchange current increases from 0.77 mA in the binary alloy to 1.35 mA with a small substitution of Sn (y=0.1). Further addition of Sn decreases the exchange current, but the kinetics continue to be superior to the binary alloy for $y \leq 0.3$. Alloys with higher Sn concentrations seem to have poor kinetics for reasons as yet unclear.

The performance of the MH alloys during charge-discharge cycling was evaluated in 250 mAh, negative limited, prismatic laboratory cells. The present cells were designed in the MH-limited configuration to understand the life-limiting mechanisms at the MH electrode and to carry out a comparative evaluation of their cyclic lifetimes. Data on the cyclic lifetimes of the cells are presented in FIG. 4. The initial capacity increases with an increase in the Sn concentration of the MH alloy. However, at the high Sn compositions of $y \geq 0.4$, the maximum capacity is reduced. The optimized Sn compositions of $0.2 \leq y \leq 0.3$ show the highest initial capacities of approximately 300 mah/g. After 100 full capacity charge-discharge cycles, $LaNi_{5-y}Sn_y$ alloys with y=0.25 and y=0.3 exhibit capacities in excess of 200 mAh/g, an impressive number when compared to the best of the Mischmetal based alloys previously evaluated under identical conditions (FIG. 4) (B. V. Ratnakumar, et al., Proc. 36th Power Sources Conf., Jun. 6–9, 1994 Cherry Hill, N.J.) p. 202. We find that the cells' capacity retention after 200 cycles improves with increased Sn concentration. It is interesting to note that alloys with high Sn compositions ($y \geq 0.4$) show long activation cycles; their maximum capacity is achieved only after 30 cycles. However, the capacity retention of these alloys is excellent, so that after extensive cycling alloys with $y \geq 0.4$ have the highest capacities. These alloys with higher Sn concentrations look promising for applications requiring high temperatures, where other alloys have plateau pressures that are too high.

EXAMPLE 3.

The manufacture of an anode for an alkaline rechargeable battery made of the metal hydride alloy was accomplished in the following manner. The alloy ingots manufactured according to the method of Example 1 were crushed to 10 mesh in an argon glove box, followed by several hydrogen absorption-desorption cycles to optimize the powder's surface area. The fine alloy powder (<75 $\mu$m) was mixed with the 19% conductive diluent, i.e., INCO nickel powder (1 $\mu$m), and 5% Teflon binder. The negative electrodes (anodes) were fabricated by hot-pressing the mixture onto an expanded Ni screen. The negative electrodes for the basic electrochemical studies were fabricated by filling the BAS (Bioanalytical Systems) disk electrodes with electrode powders of equal quantities to ensure consistent values for the electrode area (0.07 cm$^2$) and porosity. The Ni-MH test cells (approximately 250 mAh) contained excess positive electrode (NiOOH), excess electrolyte (31% KOH), and a HgO/Hg reference electrode.

EXAMPLE 4.

A detailed electrochemical evaluation of LaNi$_{4.8}$Sn$_{0.2}$, a Sn-modified LaNi$_5$, was performed in the following manner to evaluate the applicability of the alloy in the negative electrode of an alkaline rechargeable cell. Substituting a small amount of Sn for Ni provides a large improvement in the initial capacity and cyclic lifetime of the electrode, and also serves to improve the kinetics of hydrogen absorption-desorption processes.

Figure 5:
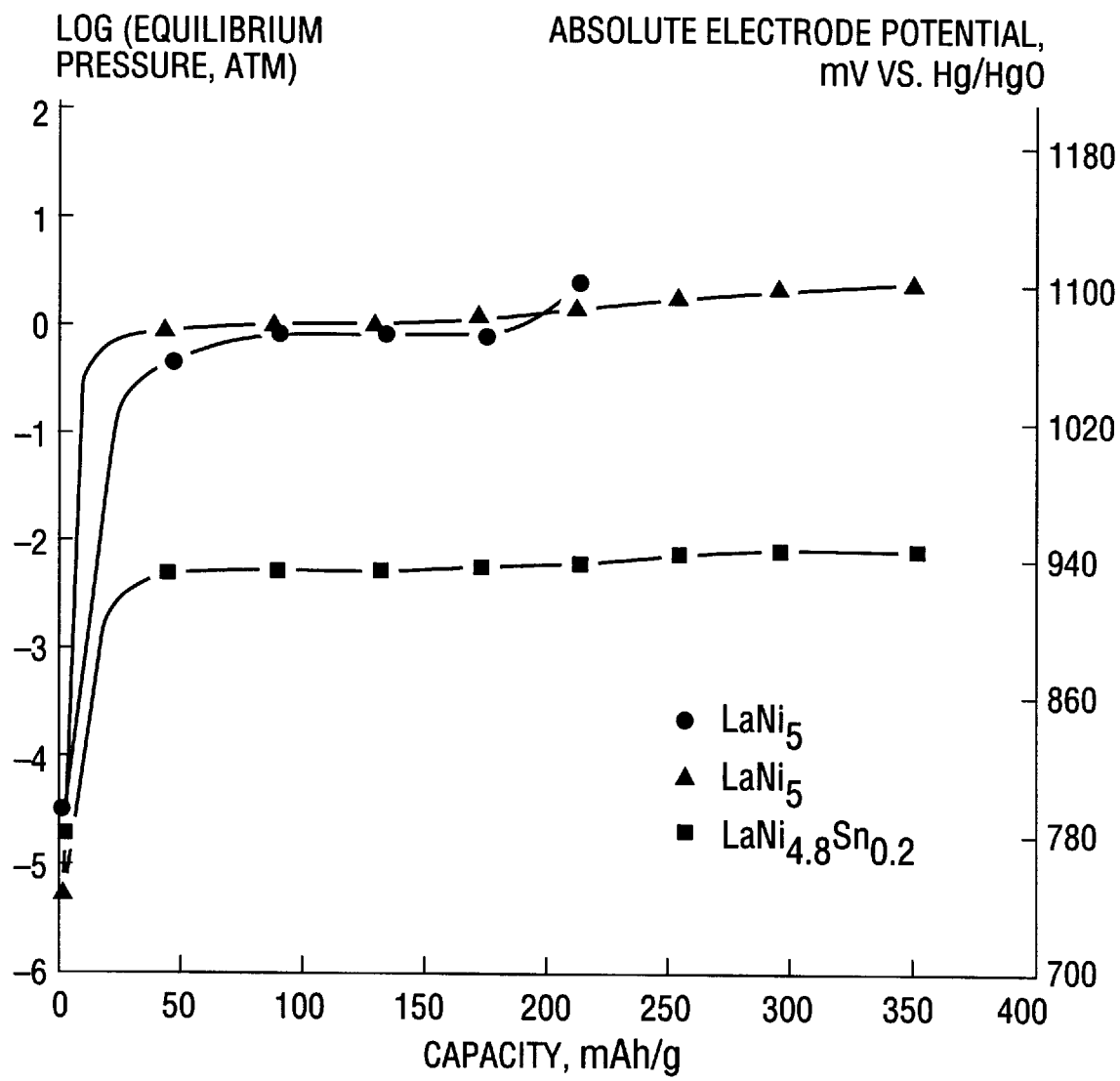
FIG. 5 shows electrochemical isotherms during charge and discharge of $LaNi_5$ and $LaNi_{4.8}Sn_{0.2}$.

FIG. 5 shows the electrochemical isotherms of LaNi$_{4.8}$Sn$_{0.2}$ during absorption and desorption of hydrogen. The equilibrium pressures were calculated from the equilibrium potentials using the equation:

$$E_0 \text{ (vs. HgO/Hg)} = -0.9324 - 0.0291 \ln(P_{H2}).$$

As may be seen from isotherms, the equilibrium pressure of LaNi$_5$ decreases upon the addition of Sn from an initial value of ~2 atm to below 1 atm. This decrease in the equilibrium plateau pressure may be related to the increase in the unit cell volume.

Figure 6:
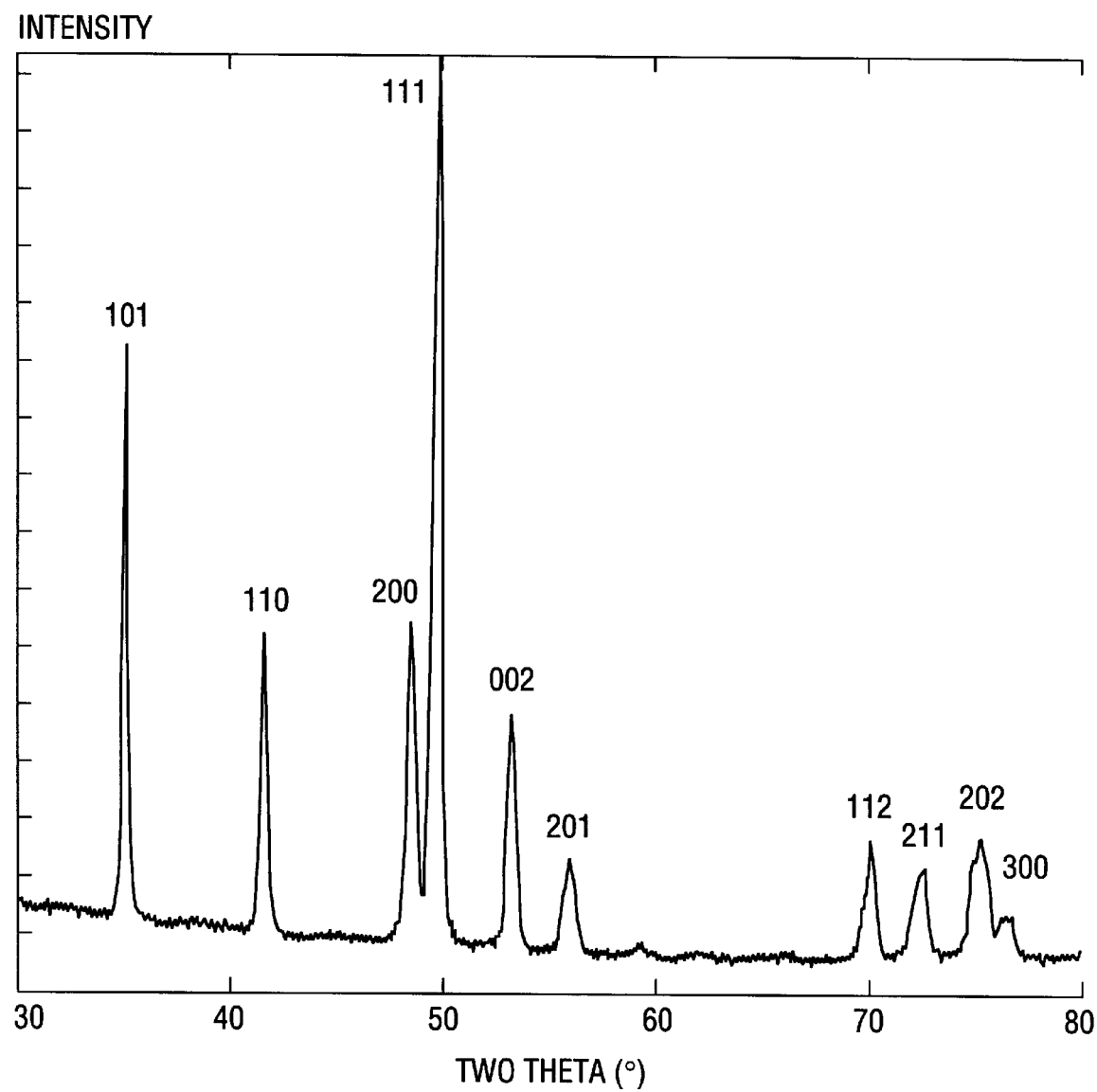
FIG. 6 shows an X-ray diffraction pattern of $LaNi_{4.8}Sn_{0.2}$.

X-ray diffractometry was used to characterize the material's microstructure and measure the lattice parameters of the binary and ternary alloys. The powder diffraction pattern of LaNi$_{4.8}$Sn$_{0.2}$ presented in FIG. 6 shows that it is single phase. There is an increase in the unit cell volume upon the substitution of Sn accompanying the decrease in the equilibrium pressure. From the X-ray diffraction data, the unit cell volume of LaNi$_{4.8}$Sn$_{0.2}$ is estimated to be 89.992 Å$^3$ as compared to 86.800 Å$^3$ for LaNi$_5$, i.e., a 3.7% increase in the unit cell volume.

The charge-discharge behavior of LaNi$_{4.8}$Sn$_{0.2}$ electrodes is superior to that of LaNi$_5$. LaNi$_{4.8}$Sn$_{0.2}$ electrodes showed a high initial capacity of 250 mAh/g in the flooded cell and ~275-300 mAh/g in the prismatic cell. Under these conditions, LaNi$_5$ could not be completely charged, since its equilibrium pressure is higher than 1 atm. Additionally, the average charging voltage for the Sn-modified LaNi$_5$ is lower than for the binary material. The charge voltage fluctuated in the case of LaNi$_5$ owing to a significant evolution of hydrogen on the electrode surface.

Figure 7A:
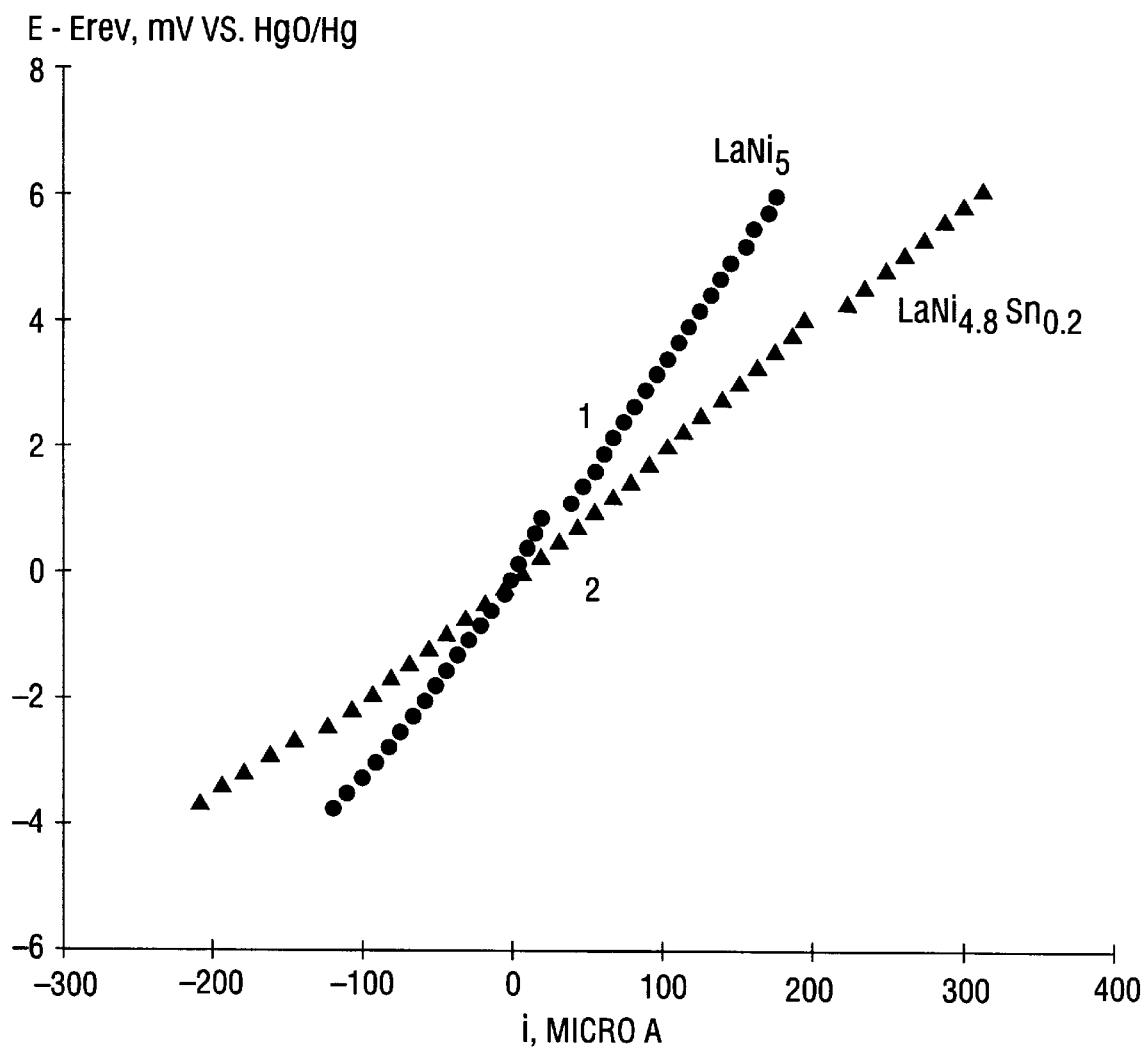
FIGS. 7A and 7B represent the linear (7A) and Tafel polarization (7B) plots of (1) $LaNi_5$ and (2) $LaNi_{4.8}Sn_{0.2}$ electrodes.
Figure 7B:
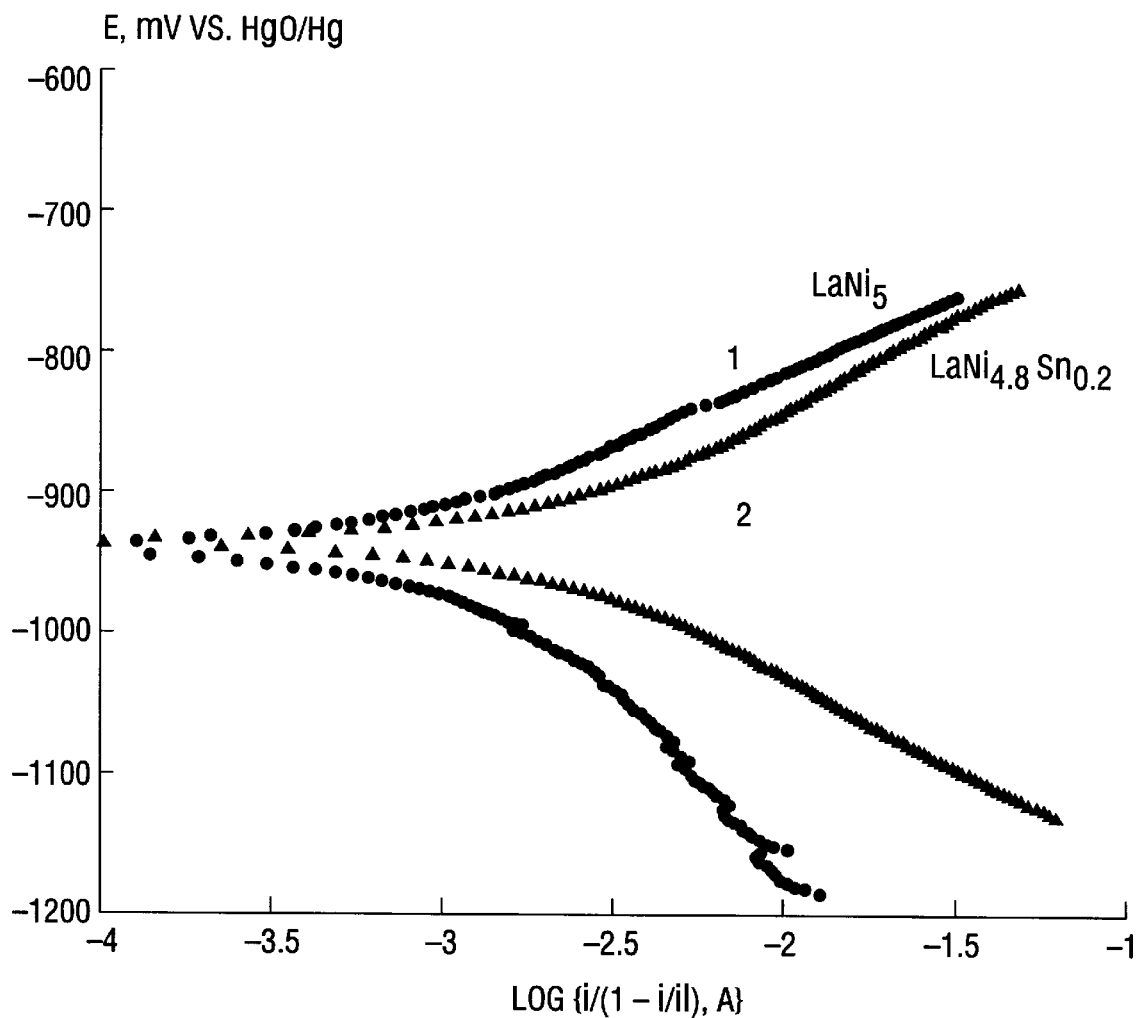

The electrochemical kinetics for the hydrogen absorption and desorption process were determined by DC polarization methods. The linear and Tafel polarization curves of these alloys are shown in FIGS. 7A and 7B, respectively, and the results are listed in Table III.

TABLE III

Electrochemical Kinetic Parameters of LaNi$_5$ and LaNi$_{4.8}$Sn$_{0.2}$ Anodes

| Linear Polarization | LaNi$_5$ | | LaNi$_{4.8}$Sn$_{0.2}$ | |
|---|---|---|---|---|
| Polarization resistance ($\Omega \cdot$ cm$^2$) | 2.33 | | 1.35 | |
| Exchange current density (10$^{-4}$ A $\cdot$ cm$^{-2}$) | 1.1 | | 1.9 | |
| Tafel Polarization | Oxidation | Reduction | Oxidation | Reduction |
| Cathodic Tafel plot (mV) | 129 | 134 | 242 | 108 |
| Transfer coefficient | 0.25 | 0.54 | 0.46 | 0.44 |
| Exchange current density (10$^{-4}$ A $\cdot$ cm$^{-2}$) | 7.5 | 8.2 | 22.5 | 26 |

The linear polarization curves are fairly linear thereby enabling calculation of the polarization resistance from their slopes. The Tafel polarization curves reveal the interference of mass transfer at high overpotentials, for which corrections have been made to the Tafel plots. The cathodic Tafel plot of LaNi$_5$ appears to show a different slope at high overpotentials, possibly corresponding to hydrogen evolution. The exchange current densities obtained from the linear and Tafel polarizations reveal that the absorption and desorption processes are faster in the ternary alloy than in the binary. In both plots, the observed area equals 0.07 cm$^2$. In (b), the data are corrected for mass transfer effects.

EXAMPLE 5.

Hydrogen absorption/desorption cycling of the alloy hydrides was carried out in batteries having anodes manufactured according to the method of Example 4. Cycling of the cells was carried out using an automatic battery cycler at constant current (4 mA/cm$^2$, C/5 rate) to a cut off voltage of −0.5 V vs. the reference electrode (HgO/Hg) during discharge and to a charge return of 120%. DC polarization experiments were performed using an EG&G 273 Galvanostat/Potentiostat interfaced with an IBM-PC. Referring to FIG. 7, linear and Tafel polarization curves were obtained under potentiodynamic conditions at slow scan rates (0.02 mV/s and 0.5 mV/s, respectively) approximating steady state conditions.

Figure 4:
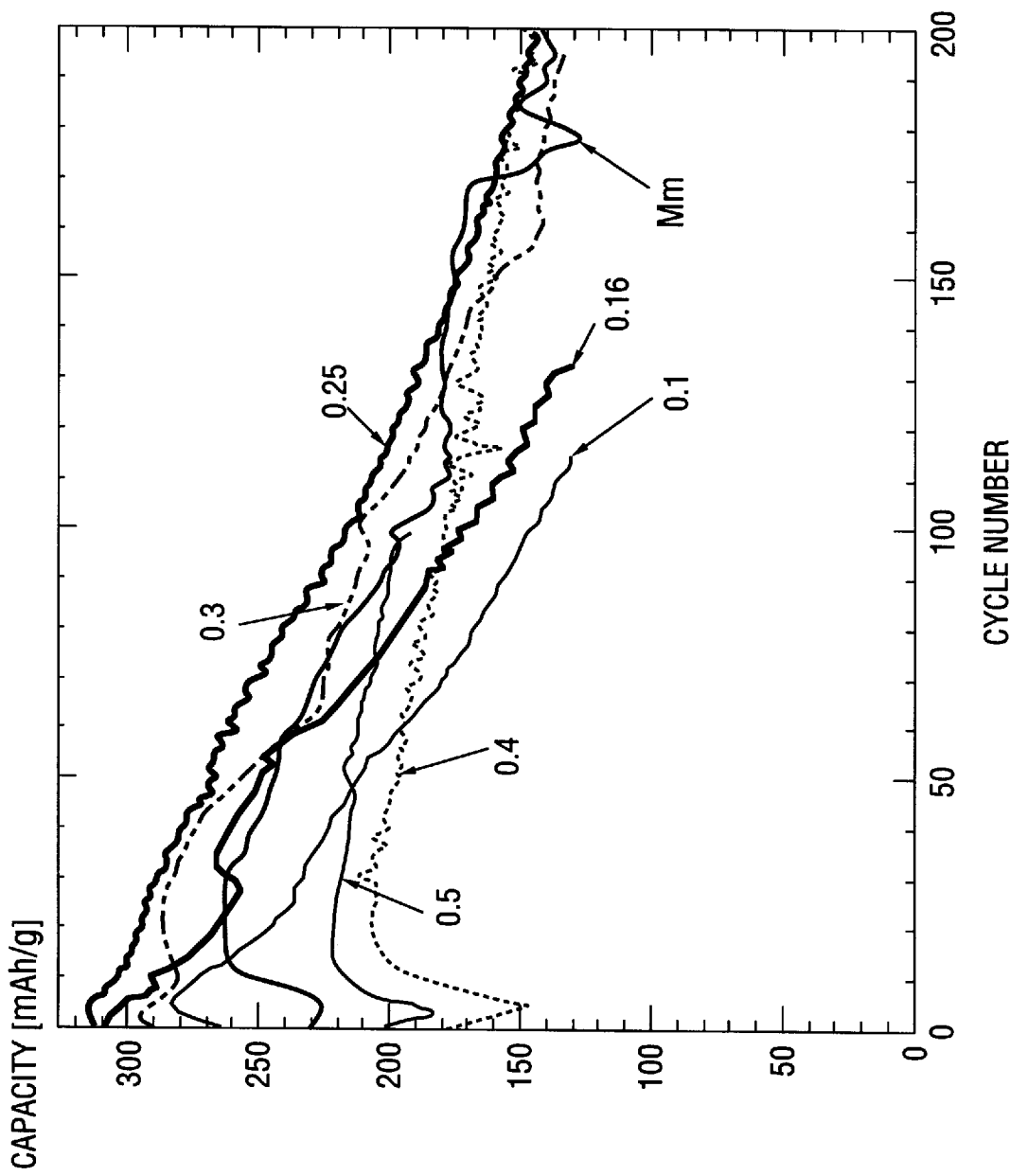
FIG. 4 illustrates cyclic lifetime behavior of $LaNi_{5-y}Sn_y$ alloys with comparison to the best mischmetal-based, multi-component alloy evaluated at JPL (reported in B. V. Ratnakumar et al., in *Proc. 36th Power Conf.* (1994), p. 202)
Figure 8:
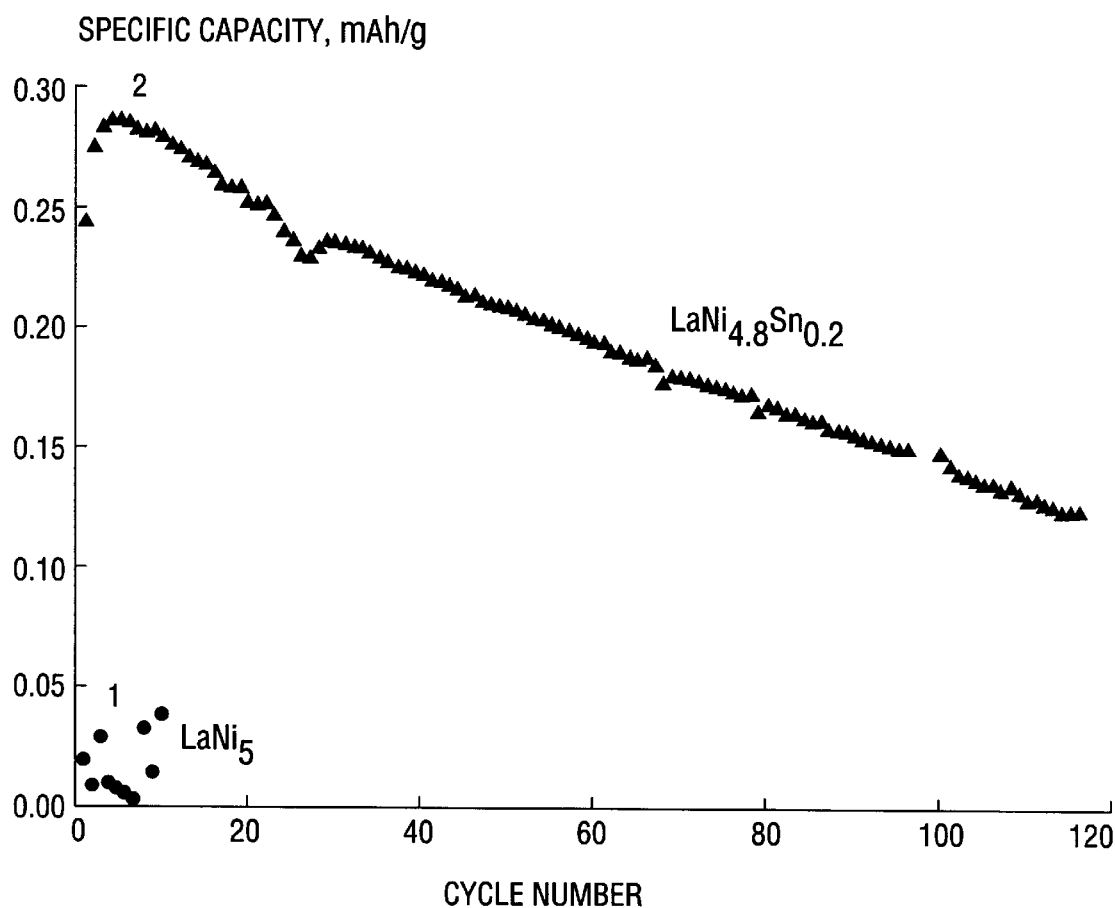
FIG. 8 illustrates the variation of capacity for 250 mAh, negative limited Ni-MH cells containing (1) $LaNi_5$ and (2) $LaNi_{4.8}Sn_{0.2}$ during cycling at a rate of one recharge to 120% of charge return every five hours.

The performance of the Sn-modified alloy during charge-discharge cycling in the negative-limited prismatic Ni-MH cells is shown in FIG. 8. The cells were charged @ 5 hour rate to 120% of charge return. The capacity of LaNi$_{5.0}$ is low (below 35 mAh/g) due to the incomplete charging. In comparison, the performance of the ternary alloy is rather impressive. Apart from a high initial capacity, LaNi$_{4.8}$Sn$_{0.2}$ also exhibits excellent capacity retention during the charge-discharge cycling. The capacity after 100 cycles is above 50% of its initial capacity. Indeed, the capacity retention during cycling of the Sn-substituted alloy is comparable to that of other experimental AB$_5$-based alloys. For example, the slope of the capacity versus cycle lifetime curve for LaNi$_{4.8}$Sn$_{0.2}$ electrodes is almost identical to the best of the (Mm) (Ni—Co—Mn—Al), alloys with optimum ratios of La and Ce/Nd in the mischmetal and Co, Mn and Al for the Ni sites, as shown in FIG. 4.

EXAMPLE 6.

A metallographic investigation was performed on a series of alloys having the composition $LaNi_{4.8}X_{0.2}$ where the ternary solute X was Si, Al, Ge, In, Sn, and Ni. The alloy ingots were manufactured according to the method of Example 1 and were crushed to 10 mesh in an argon glove box followed by one hydrogen absorption-desorption cycle to activate the powder and optimize the powder's surface area.

Figure 9A:
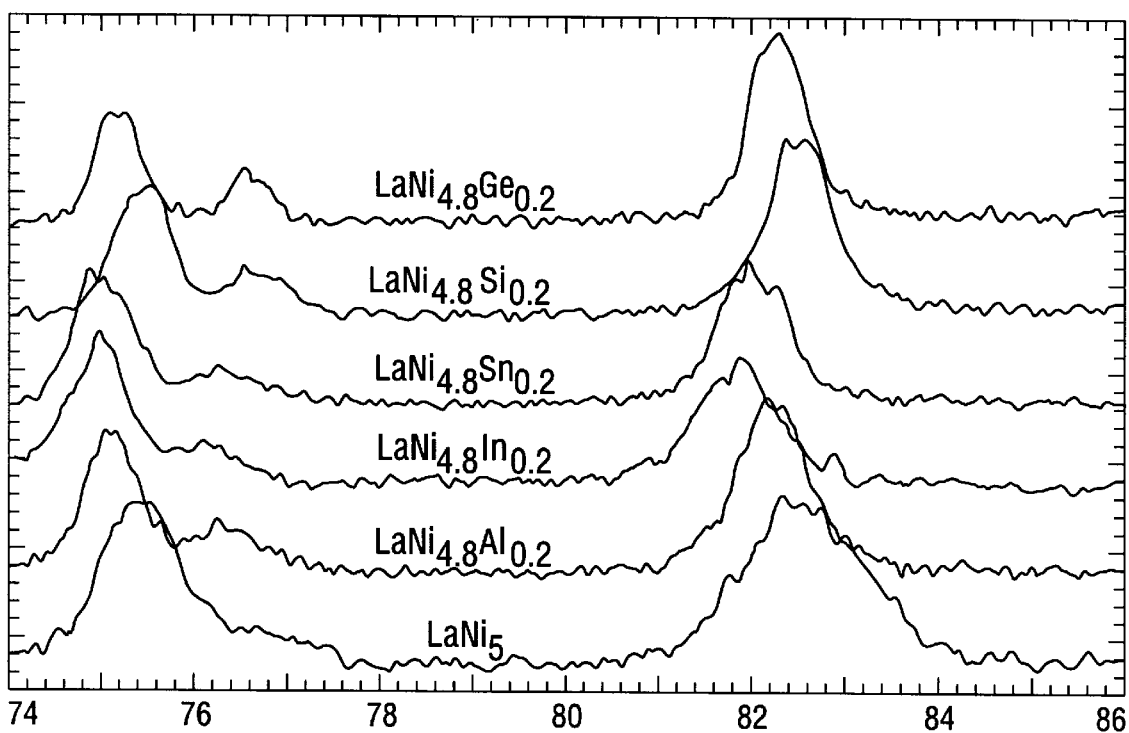
FIG. 9A illustrates X-ray diffraction patterns for $LaNi_{4.8}X_{0.2}$ alloys having Si, Al, Ge, In, Sn, and Ni as ternary solutes X.

Referring to FIG. 9A, X-ray diffraction patterns for the alloys were measured in the manner described in Example 2. The resulting diffraction patterns are arranged from top to bottom in the sequence of the relative heats of formation of the La-X alloys, i.e.; La—Ge, La—Si, La—Sn, La—In, La—Al and La—Ni. Although the diffraction patterns before hydrogen exposure were a set of sharp peaks, the microstructural damage induced by the hydrogen exposure caused a distinct broadening of the diffraction peaks. The X-ray diffraction patterns clearly show a correlation between the heat of formation of La-X and a corresponding decrease in microstructural damage after hydrogen absorption and desorption from increased sharpness of the diffraction peaks with increasing solute heat of formation.

Figure 9B:
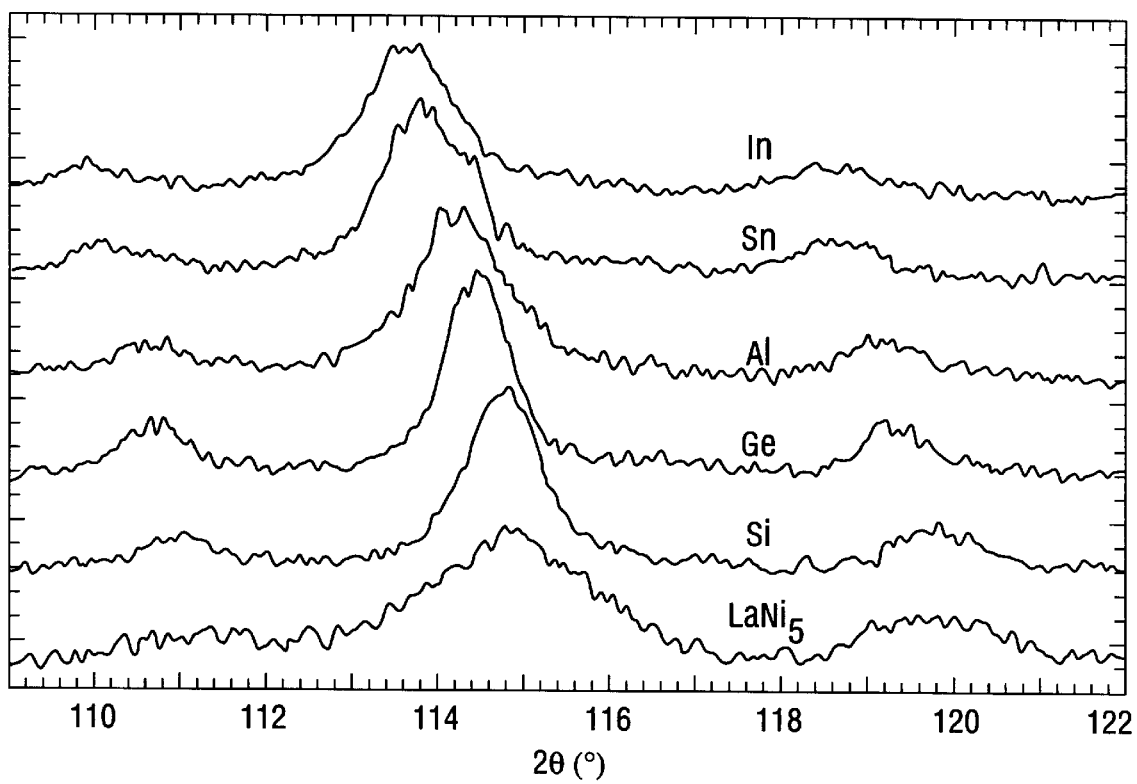
FIG. 9B illustrates a high angle region of the X-ray diffraction patterns for $LaNi_{4.8}X_{0.2}$ alloys of FIG. 9A.

Referring to FIG. 9B, a high-angle region of the diffraction pattern for the alloys of FIG. 9A are shown. The X-ray diffraction patterns for the high-angle region are arranged in the sequence of the metallic radius of the solute atoms X which are (in Angstroms); In 1.66, Sn 1.55, Al 1.43, Ge 1.37, Si 1.32, and Ni 1.25. The angle shift evidenced in the X-ray diffraction patterns shows an excellent correlation between the increase in crystallographic lattice parameters of the alloys, which shift the peaks to lower angles, and the metallic radii of the solute atoms X.

The results of the metallographic study of FIGS. 9A and 9B support the proposition that solutes X with strong chemical bonds to the rare earth element, in this case lanthanum, suppress the damage to the crystal structure of the Haucke phase during hydrogen absorption/desorption cycling. The optimal solute concentration may not be simply the concentration which suppresses the microstructural damage, however, since the hydrogen absorption capacity at 1 atmosphere pressure is known to depend on the unit cell volume of the Haucke phase. For the solutes Si, Ge, In, Al, and Sn, it is possible to optimize the hydrogen absorption capacity and the cyclic lifetime by suitable combinations of these solutes.

EXAMPLE 7.

Ge Substitution

The $LaNi_{5-y}Ge_y$ alloys in the composition range $0.1 \leq y \leq 0.5$ were produced by induction-melting in an argon atmosphere and annealed in vacuum at 950° C. for 72 hours. Chemical composition analyses of the annealed alloys, which were performed with a JEOL Superprobe 733 electron microprobe, revealed homogeneous Ge distributions at the appropriate concentrations. Phase composition and unit cell lattice parameters were measured with an INEL CPS-120 powder x-ray diffractometer using Co Kα radiation. The x-ray diffraction patterns from the $LaNi_{5-y}Ge_y$ alloy powders reveal that all the samples are single phase except for $LaNi_{4.5}Ge_{0.5}$ which contains some weak diffraction peaks due to an unidentified secondary phase. The x-ray diffraction patterns revealed an enlargement of the hexagonal unit cells of $LaNi_{5-y}Ge_y$ with increasing Ge content (summarized in Table IV), as has been noted previously by Mendelsohn, et al. (*Inorg. Chem.*, 18, 3343 (1979) and in *Rare Earths in Modern Science and Technology* edited by G. J. McCarthy and J. J. Rhyne, Plenum, N.Y., (1980), p. 593).

TABLE IV

Thermodynamic and hydriding parameters of $LaNi_{5-y}Ge_y$

| | Unit Cell | | 23° C. $P_{H_2}$ [atm] | |
| --- | --- | --- | --- | --- |
| Alloy | Volume [Å³] | $(H/M)_{max}{}^a$ | Absorption | Desorption |
| $LaNi_5$ | 86.80 | 6.45 | 2.48 | 1.65 |
| $LaNi_{4.9}Ge_{0.1}$ | 87.49 | 6.25 | 1.96 | 1.46 |
| $LaNi_{4.8}Ge_{0.2}$ | 87.65 | 5.95 | 1.37 | 1.11 |
| $LaNi_{4.7}Ge_{0.3}$ | 87.82 | 5.60 | 0.906 | 0.755 |
| $LaNi_{4.6}Ge_{0.4}$ | 88.21 | 5.00 | 0.603 | 0.548 |
| | 87.8$^c$ | | 0.85$^{c,d}$ | 0.78$^{c,d}$ |
| $LaNi_{4.5}Ge_{0.5}$ | 88.32 | 4.90 | 0.400 | 0.372 |

$^a$Isotherm measured to 2 atm.
$^b$Measured at middle of plateau
$^c$Taken from Mendelsohn, et al., Inorg. Chem., 18, 3343(1979)
$^d$Isotherm taken at 30° C.

The gas-phase isotherms for the $LaNi_{5-y}Ge_y$ alloys were obtained with an automated Sievert's apparatus. The 23° C. mid-plateau absorption and desorption pressures for the $LaNi_{4.7}Ge_{0.3}$ and $LaNi_{4.6}Ge_{0.4}$ alloys are compared to the values for $LaNi_5$ in Table IV. The gas-phase hydrogen absorption capacities of the Ge-substituted alloys (also shown in Table IV) are marginally lower than those of the binary alloy or the Sn-substituted alloys (R. C. Bowman, et al., *J. Alloys and Compounds*, 217, 185 (1995) (incorporated herein by reference), and S. Luo, et al., *J. Alloys and Compounds*, 231, 467 (1995). The equilibrium pressure of about 2 atm. for binary $LaNi_5$ decreases to below 1 atm upon Ge substitution. This decrease in the equilibrium plateau pressure with increasing unit cell volume is consistent with the observations of Mendelsohn, et al., (*Inorg. Chem.*, 18, 3343 (1979) and in *Rare Earths in Modern Science & Technology*, edited by G. J. McCarthy and J. J. Rhyne (Plenum, N.Y., 1980), p. 593.

The electrochemical measurements on the $LaNi_{5-y}Ge_y$ alloys were carried out using Teflon-bonded MH alloy disk electrodes (area=0.09 cm²) with an EG&G 273 Potentiostat/Galvanostar and a 1260 Solartron frequency Response Analyzer. The capacities obtained with the Ge-substituted alloys with y≧0.3 are in the range of 250–300 mAh/g, and are shown in FIG. 2 to be comparable to and larger than the capacities of Sn-substituted alloys. This good electrochemical capacity of the $LaNi_{5-y}Ge_y$ alloys can be attributed to a reduced absorption plateau pressure. The binary alloy and Ge-substituted alloys with y≦0.2 which have plateau pressures higher than 1 atm., are not effectively charged in our partially sealed experimental test cells.

The electrochemical kinetics for the hydrogen absorption and desorption processes were measured by DC polarization (both linear and Tafel polarization) and AC impedance methods. The results are summarized in Table V.

TABLE V

Kinetic parameters of $LaNi_{5-y}X_y$ alloys in 5.5M KOH solution.
Tafel Polarization

| Alloy | Micro-polarization $j_0(mA/cm^2)$ | $j_0(mA/cm^2)$ | Absorption Slope (mV/decade) | Desorption Slope (mV/decade) | Desorption Slope $j_0(mA/cm^2)$ |
|---|---|---|---|---|---|
| $LaNi_5$ | 8.6 | 10.7 | 242 | 108 | 11.3 |
| $LaNi_{4.8}Sn_{0.2}$ | 11.3 | 32.7 | 185 | 220 | 12.8 |
| $LaNi_{4.7}Ge_{0.3}$ | 12.0 | 38.3 | 195 | 182 | 12.9 |
| $Lani_{4.6}Ge_{0.4}$ | 12.7 | 31.7 | 217 | 184 | 13.4 |

As can be seen by reviewing the data reported in Table V, there is a fairly good agreement in the values of $j_o$, the exchange current density, obtained from these three methods. The ternary substitution in $LaNi_5$ of Ni with Ge has produced an increase in the exchange current density, as observed with Sn substitution in our earlier studies (B. V. Ratnakumar, et al., *J. Electrochem. Soc.*, 141, 189 (1994); B. V. Ratnakumar, et al., in *Hydrogen and Metal Hydride Batteries*, edited by P. D. Bennett and T. Sakai, ECS Proc. Vol. PV94-27 (Electrochem. Soc., Pennington, N.J., 1994), p. 57; B. V. Ratnakumar, et al., *J. Electrochem. Soc.*, 143, 2578 (1996), all of which are incorporated herein by reference) with tin substitution. The improvement in the kinetics for the y=0.3 and y=0.4 Ge-substituted alloys is comparable to the optimal Sn-modified alloys with Sn contents in the range $0.2 \leq y \leq 0.3$. The exchange current densities, based on the geometric areas, are 12.0 and 12.7 $mA/cm^2$ from the DC micropolarization, 38.3 and 31.7 $mA/cm^2$ from the Tafel polarization, and 12.9 and 13.4 $mA/cm^2$ from the AC impedance for $LaNi_{4.7}Ge_{0.3}$ and $LaNi_{4.6}Ge_{0.4}$, respectively. The results are summarized in Table V. The cathodic transfer coefficients corresponding to the absorption decrease from a value of 242 mV/decade for the binary alloy to 195 and 217 mV/decade for $LaNi_{4.7}Ge_{0.3}$ and $LaNi_{4.6}Ge_{0.4}$, respectively. The anodic transfer coefficients corresponding to the desorption process, on the other hand, increase, from a value of 108 mV/decade for the binary alloy to 182 and 184 Mv/decade for $LaNi_{4.7}Ge_{0.3}$ and $LaNi_{4.6}Ge_{0.4}$, respectively. We also observed a similar trend earlier for the Sn-modified alloys (B. V. Ratnakumar, et al., *J. Electrochem. Soc.*, 141, 189 (1994); B. V. Ratnakumar, et al., in *Hydrogen and Metal Hydride Batteries*, edited by P. D. Bennett and T. Sakai, ECS Proc. Vol. PV94-27 (Electrochem. Soc., Pennington, N.J., 1994), p. 57; B. V. Ratnakumar, et al., *J. Electrochem. Soc.*, 143, 2578 (1996), all of which are incorporated herein by reference).

Figure 10:
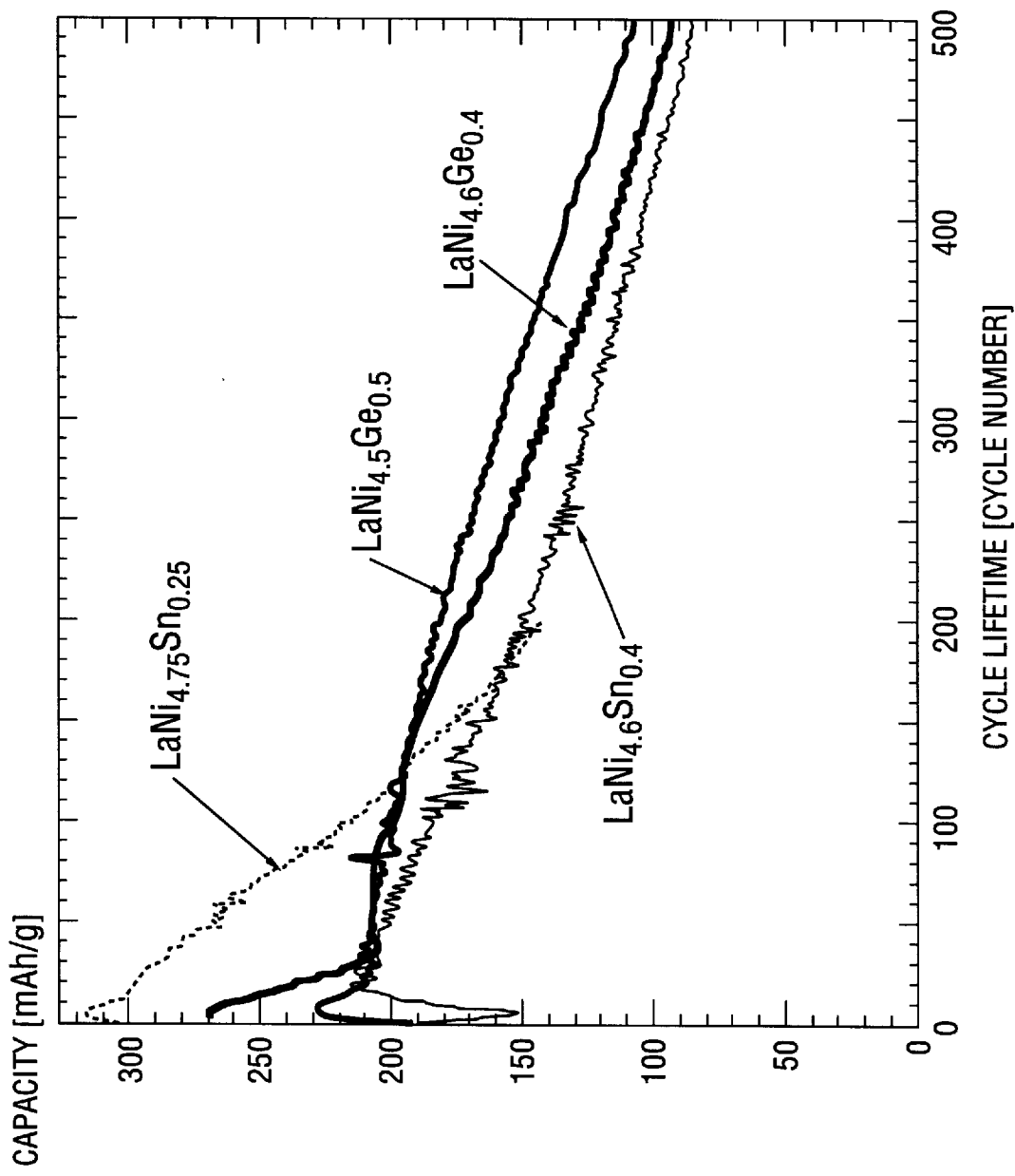
FIG. 10 illustrates cyclic lifetimes of negative limited Ni-MH electrochemical cells for the alloys $LaNi_{4.75}Sn_{0.25}$, $LaNi_{4.6}Sn_{0.4}$, $LaNi_{4.7}Ge_{0.3}$, and $LaNi_{4.6}Ge_{0.4}$.

Charge/discharge cycling of the prismatic electrodes (area=6.45 $cm^2$) was carried out in a negative-limited glass cell with NiOOH counter electrodes and an Hg/HgO reference electrode, using an Arbin Battery Cycler. The performance of the $LaNi_{5-y}Ge_y$ alloys during charge-discharge cycling in the negative-limited, prismatic Ni-MH cells is shown in FIG. 10. The cells were charged over 5 hours at 4.5 $mA/cm^2$ to 115% of charge return and discharged over 2 hours at 12.5 $mA/cm^2$ to 0.5 V vs. the Hg/HgO reference electrode. The cycle lives of two Ge-substituted alloys are compared in FIG. 10 to that found for $LaNi_{4.75}Sn_{0.25}$ and $LaNi_{4.6}Sn_{0.4}$. Although those Ge-substituted alloys exhibit rather rapid initial losses in capacities during the first 10–20 cycles, the deterioration becomes much slower as cycling continues. As summarized in Table VI, the long-term stability of these $LaNi_{5-y}Ge_y$ alloys equals or exceeds that our group previously measured on optimized Sn-substituted alloys.

TABLE VI

Long-term stabilities of some $LaNi_{5-y}Sn_y$ and $LaNi_{5-y}Ge_y$ alloys during electrochemical charge/discharge cyclings

| Alloy | % Decay/Cycle |
|---|---|
| $LaNi_{4.75}Sn_{0.25}$ | 0.65 |
| $LaNi_{4.6}Sn_{0.40}$ | 0.15 |
| $LaNi_{4.8}Ge_{0.2}$ | 0.99 |
| $LaNi_{4.7}Ge_{0.3}$ | 0.36 |
| $LaNi_{4.6}Ge_{0.4}$ | 0.26 |
| $LaNi_{4.5}Ge_{0.5}$ | 0.19 |

Fuel Cells

In another aspect of the invention, the previously described alloys are used as electrocatalysts for the oxygen reduction reaction in electrochemical devices such as fuel cells and batteries. A fuel cell application is described below, however, it is understood that use of the alloys for electrocatalysis of the oxygen reduction reaction may be used in any other electrochemical device.

Fuel cells differ from batteries in that the reactants are not contained in the cell. A fuel, generally a gas, is provided which is consumed in the fuel cell at the anode to produce useful energy. An oxidant, generally oxygen, is provided at the cathode where the reduction of the oxidant occurs. The reactants (fuel and oxidant) are stored outside the reaction areas while the electrodes are ideally invariant in composition.

Figure 11:
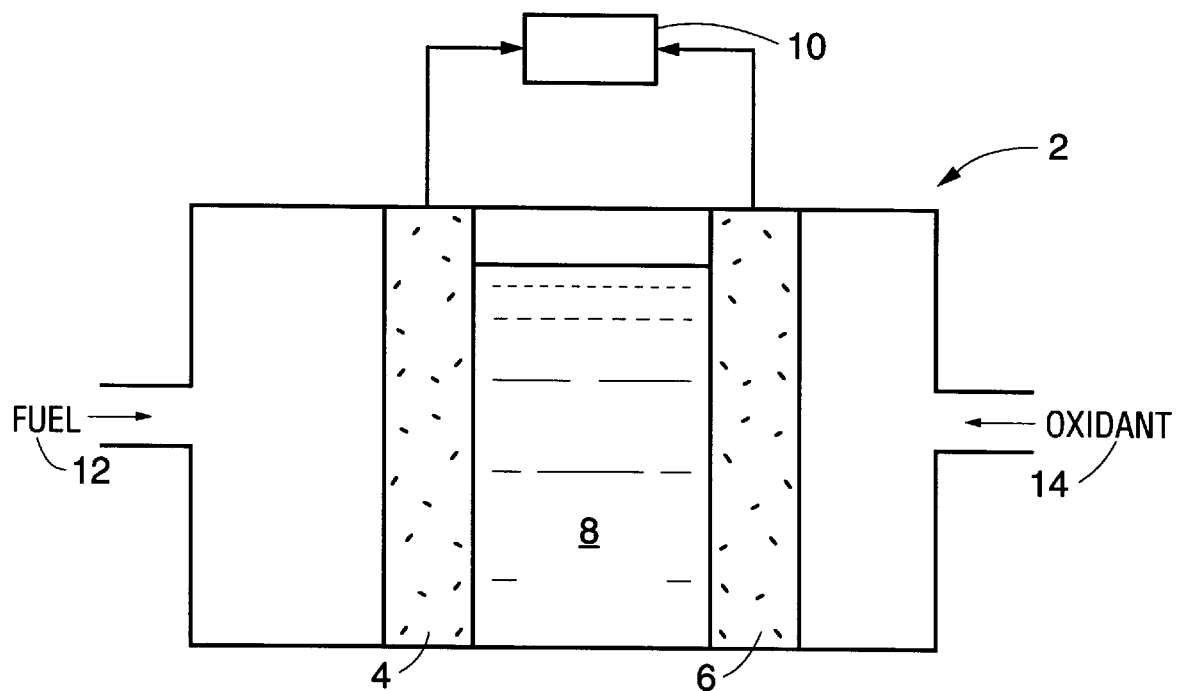
FIG. 11 shows the construction of a typical fuel cell.

Referring to FIG. 11, a typical fuel cell 2 is shown. The fuel cell 2 includes an anode 4 and a cathode 6 with an electrolyte 8 contained therebetween. An ionic separator can be used where needed. A load 10 is electrically coupled to the anode 4 and cathode 6 for performing useful work with the electrical energy provided by the fuel cell 2. A fuel contacts the anode 4 while an oxidant 14 contacts the cathode.

In a hydrogen-oxygen fuel cell, the principal reactions are as follows:

Anode $H_2 \rightarrow 2H^+ + 2e^-$

Cathode $\frac{1}{2}O_2 + 2H^+ + 2e^- \rightarrow H_2O$ and the overall cell reaction is simply:

$H_2 + \frac{1}{2}O_2 \rightarrow H_2O$

The fuel cell 2 described above has an acidic electrolyte 8. The electric current is transported through the electrolyte 8 by the flow of hydrogen ions. If an alkaline electrolyte is used, the electric current is transported through the electrolyte by the flow of hydroxyl ions. In high temperature fuel cells, the ionic carriers in the electrolyte may be carbonate ions or oxide ions.

The present application may be practiced using any suitable electrolyte 8 and fuel 12. Examples of typical electrolytes 8 include aqueous alkaline, aqueous acid, molten carbonate and solid oxide electrolytes. The fuel 12 is preferably hydrogen gas but may also be a hydrocarbon, hydrazine, methanol, ammonia, formic acid or formaldehyde.

The principal reactions in the fuel cell 2 occur at the interface between the electrolyte 8, electrodes 4, 6 and the fuel 12 or oxidant 14. For this reason, the electrodes 4, 6 are generally porous to maximize the gas/electrolyte interface when gaseous fuels 12 are used.

The choice of electrode materials for anodic electrocatalysis of hydrogen is readily effected by a fairly wide range of electrocatalysts in a variety of electrolytes. Hydrogen electrode current densities in excess of 200 mA/cm$^2$ can be achieved at anodic polarizations of less than 30 mV under mild operating conditions with typical catalysts. The oxygen reduction reaction, on the other hand, have polarizations of about 300–350 mV at the same current density. Noble metal catalysts are sometimes used for the electrocatalysis of hydrogen. Other suitable materials include nickel, nickel boride, sodium tungsten bronzes, tungsten trioxide and tungsten carbide. Although any suitable anode material may be used, the alloys described above are particularly useful as anode materials. The ability of the $AB_5$-based alloys to absorb hydrogen is particularly useful since they can store up to one atom of hydrogen per metal atom.

Cyclic voltammetric studies were carried out on a cathode made of the previously described alloys in an alkaline electrolyte solution. Specifically, electrodes were fabricated from $Mm(NiCoAl)_5$ which is an $AB_5$-based alloy. Any of the other A or B ternary substitutes discussed above may also be used for the cathode material of the present invention. The use of mischmetal (Mm) makes the alloy particularly attractive since it will be relatively inexpensive.

The test electrodes were subjected to an initial anodic scan (oxidation) to a potential of 0.4 V vs. Hg/HgO (or ~0.5 V vs. SHE) before the absorption of hydrogen. The interference due to the dehydriding reaction of the MH electrode was thus eliminated. The cyclic voltammetric peaks in this region would correspond to either the oxidation of the elements of the MH or the reactions involving electrolyte. Subsequently, the electrode was subject to a reverse (cathodic) scan to examine the reduction of the dissolved/evolved oxygen or any oxidized species from the MH alloy.

Figure 12:
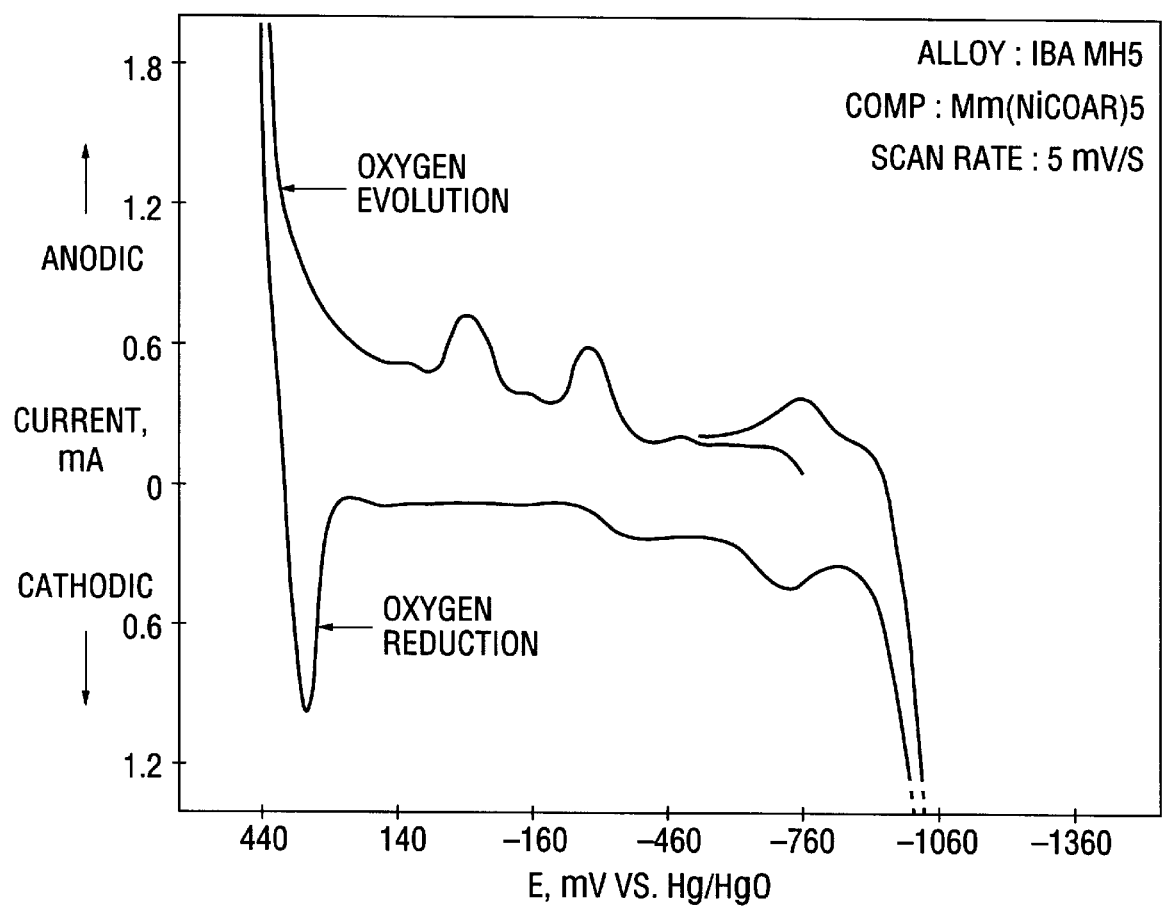
FIG. 12 is a voltammogram of a $Mm(NiCoAl)_5$ electrode in an alkaline solution.

Referring to FIG. 12, a voltammogram of the $Mm(NiCoAl)_5$ alloy is shown. The electrode (approximately 0.12 cm$^2$) was immersed in 6M KOH and exhibited two or three small peaks around 50 mV vs. Hg/HgO and a strong peak at 400 mV. The small peaks were attributed to the dissolved oxygen, since all the metallic constituents of the alloy were apparently oxidized even at the open circuit potential of –500 mV. Only elemental manganese can undergo oxidation to a high valence oxide in this range. The peak around 400 mV is related to the oxygen evolution at the MH electrode. In the subsequent reduction scan, a strong peak was observed at 350 mV, which may be assigned to the reduction of the oxygen either dissolved in the electrolyte or evolved in the preceding anodic scan.

Thus, it is clear that the reduction of oxygen as well as oxygen evolution occurs readily on the electrode which can be readily exploited in alkaline metal air cells or fuel cells. The ability to electrocatalyze the oxygen reduction reaction would enable the alloys to be used in a hermetically sealed configuration, especially in the positive limited design. The oxygen evolved at the positive electrode would be continuously reduced at the MH electrode, thereby providing an overcharge capability for the cell.

A further advantage of the present invention is that the alloys of the present invention may be used as electrocatalysts for the oxygen reduction reaction as well as electrodes for the hydrogen ionization reaction. Thus, the alloys of the present invention may act as a bipolar electrode in regenerative fuel cells.

Figure 13:
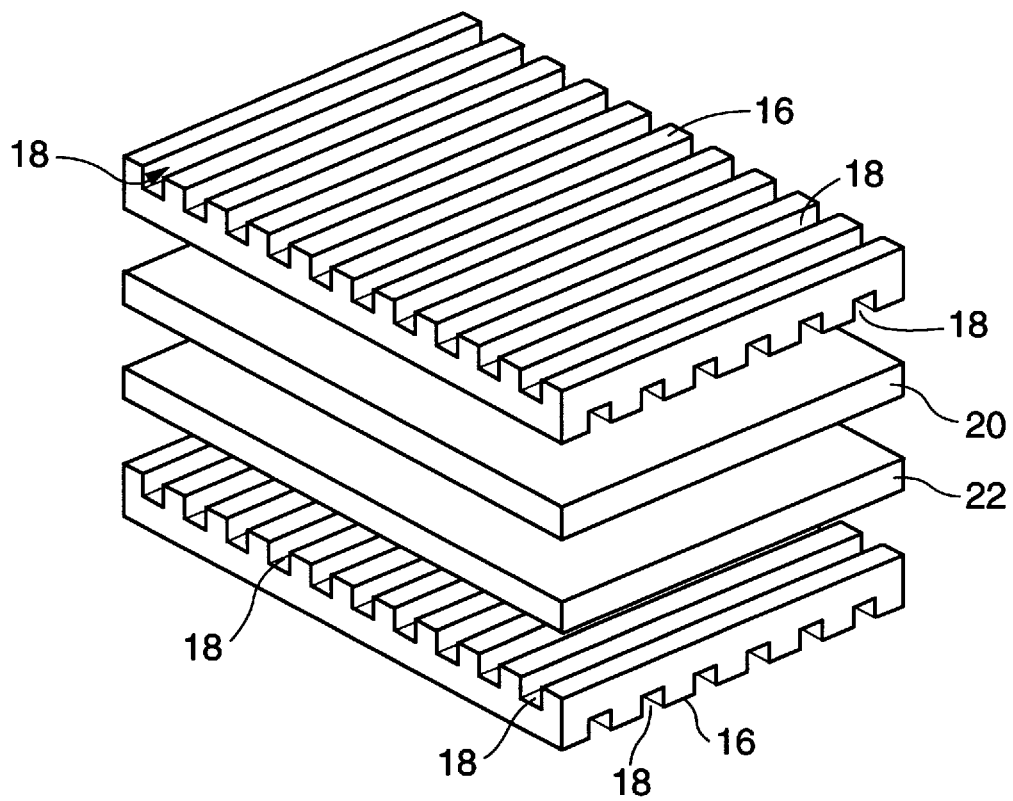
FIG. 13 is an exploded isometric view of a bipolar fuel cell.

Referring to FIG. 13, the basic components of bipolar fuel cell are shown. The bipolar fuel cell includes two porous separator plates 16 having channels 18 formed therein. The channels 18 provide flow paths for the oxidant, fuel and water. Sandwiched between the porous separator plates 16 are an anode substrate 20 and a cathode substrate 22. As described above, the alloys described herein are suitable for forming the anode and cathode substrates 20, 22.

Figure 14:
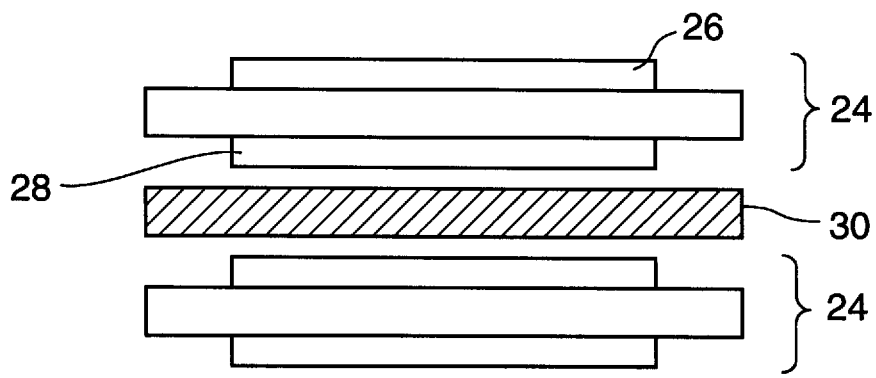
FIG. 14 is a side view of a bipolar electrode for a battery.

The ability of the alloys described above to electrocatalyze the oxygen reduction reaction may also be utilized in batteries. A particularly useful application is in a bipolar metal hydride air cell or battery. Referring to FIG. 14, a battery structure incorporating bipolar electrodes is shown. The bipolar electrode 24 is preferably a plate having a positive side 26 and a negative side 28. In FIG. 14, a side view of a battery having two bipolar electrodes 24 is shown. A separator 30 separates the electrodes 24. A cover (not shown) surrounds the bipolar electrodes 24 and separators 30 and provides individual fluid chambers for containing an electrolyte. The battery is modular in that a number of bipolar electrodes 24 and separators 30 may be stacked one on top of the other thereby providing a flexible system.

The bipolar battery and bipolar fuel cell offer distinct advantages over conventional batteries and fuel cells having external electrical connections. Elimination of the electrical connections minimizes internal resistance and enhances specific energy and power density.

Although the invention has been described in some respects with reference to specified preferred embodiments thereof, many variations and modifications will be apparent to those skilled in the art. It is, therefore, the intention that the following claims not be given a restrictive interpretation but should be viewed to encompass such variations and modifications that may be derived from the inventive subject matter disclosed.

We claim:

1. A fuel cell, comprising:
   an alkaline electrolyte;
   an anode contacting the electrolyte, the anode being made of a material selected to electrocatalyze a fuel;
   a cathode contacting the electrolyte, the cathode being made of a material selected to electrocatalyze oxygen, the cathode material being an at least ternary hydridable alloy having the formula:
   $AB_{(Z-Y)}X_Y$, as an atomic ratio where $4.8 \leq Z \leq 6.0$;
   A includes at least one substance selected from the group consisting of cerium, lanthanum, neodymium, praseodymium, yttrium and mischmetal;
   B includes at least one element selected from the group consisting of cobalt, iron, aluminum and nickel;
   X includes at least one element E selected so that at least one binary alloy selected from the group consisting of AE and BE has an enthalpy of formation greater than that of binary alloy LaSn; and
   Y is greater than or equal to zero.

2. The fuel cell of claim 1, wherein z is about 5.

3. The fuel cell of claim 1, wherein:
   A is lanthanum;
   B is nickel; and
   X includes at least one element E selected from the group consisting of antimony, arsenic, germanium, tin and bismuth.

4. The fuel cell of claim 1, wherein:

A is lanthanum;

B is nickel; and

X includes germanium.

5. The fuel cell of claim 1, wherein:

A is lanthanum;

B is nickel; and

X includes tin.

6. The fuel cell according to claim 1, wherein X includes germanium and another element.

7. The fuel cell according to claim 6, wherein X includes germanium and tin.

8. A hydridable alloy having at least three elements, said alloy having the formula:

$AB_{(Z-Y)}X_{(Y)}$, as an atomic ratio wherein $4.8 \leq Z \leq 6.0$;

wherein A is lanthanum alone or with at least one other element selected from the group consisting of the rare earth metals;

B comprises nickel;

X includes at least one element E selected from the group consisting of antimony, arsenic, germanium, tin and bismuth, so that at least one binary alloy selected from the group consisting of AE and BE where the alloy has an enthalpy of formation greater than that of the enthalpy of formation of binary alloy LaSn; and Y being greater than zero and less than one.

9. The hydridable alloy of claim 8, wherein Z is about 5.

10. The hydridable alloy of claim 8, wherein:

A is lanthanum;

B is nickel; and

X includes germanium.

11. The hydridable alloy of claim 8, wherein:

A is lanthanum;

B is nickel; and

X includes tin.

12. The hydridable alloy of claim 8, wherein the alloy has at least four elements.

13. A hydridable alloy having at least three elements, said alloy having the formula:

$AB_{(Z-Y)}X_{(Y)}$, as an atomic ratio wherein $4.8 \leq Z \leq 6.0$;

A consisting essentially of lanthanum;

B includes at least one element selected from the group consisting of cobalt, iron, and nickel;

X includes at least one element selected from the group consisting of antimony, arsenic, germanium, tin and bismuth.

14. A rechargeable battery comprising:

an alkaline electrolyte;

a cathode contacting the alkaline electrolyte; and an anode contacting the alkaline electrolyte solution, the anode being made of an at least ternary hydridable alloy having the formula:

$AB_{(Z-Y)}X_{(Y)}$, as an atomic ratio wherein $4.8 \leq Z \leq 6.0$;

A includes at least one element selected from the group consisting of the rare earth metals;

B includes at least one element selected from the group consisting of iron, ruthenium, osmium, cobalt, rhodium, iridium, nickel, palladium, platinum, copper, silver, gold, zinc, manganese, cadmium, mercury and aluminum;

X includes at least one element E selected so that at least one binary alloy selected from the group consisting of AE and BE has an enthalpy of formation greater than that of binary alloy LaSn; and Y is greater than zero and less than one.

15. The rechargeable battery of claim 14, wherein Z is about 5.

16. The rechargeable battery of claim 14, wherein:

A comprises an element selected from the group consisting of cerium, lanthanum, neodymium, praseodymium, and yttrium.

17. The rechargeable battery of claim 14, wherein:

A comprises a mischmetal.

18. The rechargeable battery of claim 14, wherein:

B comprises an element selected from the group consisting of cobalt, iron, and nickel.

19. The rechargeable battery of claim 14, wherein:

A comprises lanthanum;

B comprises nickel; and

X comprises at least one element selected from the group consisting of antimony, arsenic, germanium, tin and bismuth.

20. The rechargeable battery of claim 14, wherein:

the anode and cathode form a bipolar electrode.

\* \* \* \* \*